US011977957B2

(12) United States Patent
Shanmugam Sakthivadivel et al.

(10) Patent No.: US 11,977,957 B2
(45) Date of Patent: May 7, 2024

(54) QUANTUM COMPUTING PROGRAM COMPILATION USING CACHED COMPILED QUANTUM CIRCUIT FILES

(71) Applicant: Amazon Technologies, Inc., Seattle, WA (US)

(72) Inventors: Saravanakumar Shanmugam Sakthivadivel, White Plains, NY (US); Jeffrey Paul Heckey, Seattle, WA (US); Derek Bolt, Seattle, WA (US); Yunong Shi, Stamford, CT (US); Jon-Mychael Allen Best, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 466 days.

(21) Appl. No.: 17/393,286

(22) Filed: Aug. 3, 2021

(65) Prior Publication Data
US 2023/0040849 A1 Feb. 9, 2023

(51) Int. Cl.
*G06N 10/00* (2022.01)
*G06F 8/41* (2018.01)
*G06N 10/80* (2022.01)

(52) U.S. Cl.
CPC ............... *G06N 10/80* (2022.01); *G06F 8/41* (2013.01); *G06N 10/00* (2019.01)

(58) Field of Classification Search
CPC ........ G06N 10/80; G06N 10/00; G06N 10/40; G06N 10/60; G06N 10/20; G06F 8/41; G06F 8/54
See application file for complete search history.

(56) References Cited

U.S. PATENT DOCUMENTS

| 6,741,585 B1 | 5/2004 | Munoz et al. |
| 7,484,091 B2 | 1/2009 | Bade et al. |
| 7,996,836 B1 | 8/2011 | McCorkendale et al. |

(Continued)

FOREIGN PATENT DOCUMENTS

| EP | 1701259 | 9/2006 |
| EP | 2557498 | 2/2013 |

(Continued)

OTHER PUBLICATIONS

Roberts, "Partial-Match Retrieval via the Method of Superimposed Codes," 1979, Proceedings of the IEEE, vol. 67, No. 12, pp. 1624-1642.

(Continued)

*Primary Examiner* — Naum Levin
(74) *Attorney, Agent, or Firm* — Alexander A. Knapp; Kowert, Hood, Munyon, Rankin & Goetzel, P.C.

(57) ABSTRACT

A quantum computing service may store, in a cache, one or more compiled files of respective quantum functions included in one or more quantum computing programs received one or more customers. When the quantum computing service receives another quantum computing program, from the same or a different customer, the quantum computing service may determine whether the quantum computing program may include one or more of the quantum functions corresponding to the compiled files in the cache. If so, the quantum computing service may use the compiled files in the cache to compile the quantum computing program.

20 Claims, 12 Drawing Sheets

(56) References Cited

U.S. PATENT DOCUMENTS

| | | | |
|---|---|---|---|
| 8,032,899 B2 | 10/2011 | Archer et al. | |
| 8,127,292 B1 | 2/2012 | Dobrovolskiy et al. | |
| 8,201,161 B2 | 6/2012 | Challener et al. | |
| 8,239,557 B2 | 8/2012 | McCune et al. | |
| 8,433,802 B2 | 4/2013 | Head et al. | |
| 8,514,868 B2 | 8/2013 | Hill | |
| 9,230,016 B2 | 1/2016 | Neill | |
| 9,323,552 B1 | 4/2016 | Adogla et al. | |
| 9,361,145 B1 | 6/2016 | Wilson et al. | |
| 9,485,323 B1 | 11/2016 | Stickle et al. | |
| 9,979,694 B2 | 5/2018 | Brandwine et al. | |
| 10,095,537 B1 | 10/2018 | Neogy et al. | |
| 10,482,413 B2 | 11/2019 | Paterra | |
| 10,498,611 B1 | 12/2019 | Kloberdans et al. | |
| 10,592,216 B1 | 3/2020 | Richardson | |
| 10,713,582 B2 * | 7/2020 | Dadashikelayeh | G06F 8/30 |
| 11,010,145 B1 * | 5/2021 | Smith | G06N 10/00 |
| 11,222,279 B2 * | 1/2022 | Gambetta | G06N 10/00 |
| 11,442,702 B2 | 9/2022 | Smith | |
| 11,650,869 B2 * | 5/2023 | Heckey | G06F 9/547 |
| | | | 706/12 |
| 11,658,948 B2 * | 5/2023 | Benson | H04L 9/3218 |
| | | | 713/151 |
| 2005/0013280 A1 | 1/2005 | Buddhikot et al. | |
| 2005/0251806 A1 | 11/2005 | Auslander et al. | |
| 2008/0244553 A1 | 10/2008 | Cromer et al. | |
| 2010/0070970 A1 | 3/2010 | Hu et al. | |
| 2011/0075667 A1 | 3/2011 | Li et al. | |
| 2011/0131443 A1 | 6/2011 | Laor et al. | |
| 2014/0208413 A1 | 7/2014 | Grobman et al. | |
| 2015/0160884 A1 | 6/2015 | Scales et al. | |
| 2016/0026573 A1 | 1/2016 | Jacobs et al. | |
| 2016/0077845 A1 | 3/2016 | Earl et al. | |
| 2016/0170781 A1 | 6/2016 | Liguori et al. | |
| 2016/0170785 A1 | 6/2016 | Liguori et al. | |
| 2017/0300354 A1 | 10/2017 | Dalal et al. | |
| 2017/0366606 A1 | 12/2017 | Ben-Shaul et al. | |
| 2018/0260125 A1 | 9/2018 | Botes et al. | |
| 2020/0117469 A1 | 4/2020 | Siegwart | |
| 2020/0394027 A1 | 12/2020 | Ducore | |
| 2021/0012233 A1 * | 1/2021 | Gambetta | G06F 8/44 |
| 2021/0019125 A1 | 1/2021 | Shi | |
| 2021/0157662 A1 * | 5/2021 | Heckey | G06F 9/5072 |
| 2021/0166133 A1 * | 6/2021 | Ronagh | G06N 3/045 |
| 2021/0286601 A1 * | 9/2021 | Fitzsimons | G06N 10/80 |
| 2021/0303279 A1 | 9/2021 | Bird | |
| 2022/0084085 A1 * | 3/2022 | Rigetti | G06Q 30/0283 |
| 2022/0215279 A1 * | 7/2022 | Rahman | G06N 10/00 |
| 2022/0358390 A1 * | 11/2022 | Ruedinger | G06N 10/80 |
| 2023/0020389 A1 * | 1/2023 | Davis | G06F 9/5038 |
| 2023/0099621 A1 | 3/2023 | Shi | |
| 2023/0259802 A1 * | 8/2023 | Klimov | G06N 3/084 |
| | | | 706/62 |

FOREIGN PATENT DOCUMENTS

| | | | | |
|---|---|---|---|---|
| WO | 2019222748 A1 | 11/2019 | | |
| WO | WO-2021108510 A1 * | 6/2021 | | G06F 9/5044 |

OTHER PUBLICATIONS

Klappenecker, "Quantum Software Reusability," 2003, arXiv:quant-ph/0309121v2, pp. 1-20.

Jeff Barr, "Amazon Braket-Get Started with Quantum Computing", AWS News Blog, Retrieved from https://aws.amazon.com/blogs/aws/amazon-braket-get-started-with-quantum-computing/ on Jul. 30, 2021, pp. 1-7.

Peter Karaleka, et al., "Fast hybrid programming with Quantum Cloud Services", Retrieved from https://medium.com/rigetti/fast-hybrid-programming-with-quantum-cloud-services-7573f48b93b5 on Jul. 30, 2021, pp. 1-8.

U.S. Appl. No. 16/698,674, filed Nov. 27, 2019, Jeffrey Paul Heckey, et al.

Igor L. Markov, et al., "Quantum Supremacy is Both Closer and Farther than It Appears", arXiv:1807.10749v3, Sep. 26. 2048. pp. 1-32.

Ozgur Ulusoy, "Processing Real-Time Transactions in a Replicated Database System," 1994 Kluwer Academic Publishers, Boston, Revised Sep. 10, 1993, pp. 1-32.

Sergio Almeida, et al., "ChainReaction: a Causal+ Consistent Datastore based on Chain Replication," Eurosys'13 Apr. 15-17, 13, 2013, Prague, Czech Republic, Copyright 2013 ACM 978-1-4503-1994-2/13/04, pp. 85-98.

Scott Lystig Fritchie, "Chain Replication in Theory and in Practice," Erlang'10, Sep. 30, 2010, Baltimore, Maryland, USA. Copyright 2010 ACM 978-1-4503-0253-1/10/09, pp. 1-11.

Robbert van Renesse, et al. "Chain Replication for Supporting High Throughput and Availability," USENIX Association, OSDI 2004: 6th Symposium on Operating Systems Design and Implementation, pp. 91-104.

Philip A. Bernstein, et al, "Concurrency Control and Recovery in Database Systems," Addison-Wesley Publication Company, ISBN 0-201-10715-5, 1987, pp. 1-58.

From Wikipedia, the free encyclopedia, "Bromium," downloaded on Jun. 27, 2016 from https://en.wikipedia.org/wiki/ Bromium, pp. 1-4.

Xen, "Dom0" downloaded Jun. 6, 2016 from http://wiki.xen.org/wiki/Dom0, last updated Mar. 29, 2015, pp. 1-2.

Amazon Web Services, "Amazon Elastic Compute Cloud: User Guide for Linux Instances," Latest Version update 2015, pp. 1-816.

IBM, General Information, Version 4, Release 3.0, Fifth Edition, Apr. 2002, pp. 1-101.

From Wikipedia, the free encyclopedia, "Hypervisor," downloaded Jun. 6, 2016 from https://en.wikipedia.org/wiki/ Hypervisor, pp. 1-7.

Axel Buecker, et al., "Reduce Risk and Improve Security on IBM Mainframes: vol. 1 Architecture and Platform Security," Redbooks, IBM, Dec. 2014, pp. 1-308.

From Wikipedia, the free encyclopedia, "VMware ESX," downloaded Jun. 6, 2016 from https://en.wikipedia.org/wiki/VMware_ESX, pp. 1-13.

From Wikipedia, the free encyclopedia, "Xen," downloaded from Jun. 6, 2016 from https://en.wikipedia.org/wiki/Xen, pp. 1-12.

Udo Steinberg, et al., "NOVA: A Microhypervisor-Based Secure Virtualization Architecture", ACM, EuroSys'10, Apr. 13-16, 2010, pp. 209-222.

Sangster, et al., TCG Published, Virtualized Trusted Platform Architecture Specification, Specification Version 1.0, Revision 0.26, Sep. 27, 2011, pp. 1-60.

Network Functions Virtualisation (NFV); NFV Security; Security and Trust Guidance, ETSI GS NFV-SEC 003, V1.1.2, downloaded by EP on Jun. 4, 2016, pp. 1-57.

Cong Xu, et al., "vSlicer: Latency-Aware Virtual Machine Scheduling via Differentiated-Frequency CPU Slicing", Purdue University, Purdue e-Pubs, 2012, pp. 1-14.

Amazon Web Services, "Amazon Elastic Compute Cloud: User Guide for Linux Instances," Latest Version update 2018, pp. 1-884.

Amazon Web Services, "Amazon Elastic Container Service: Developer Guide" API Version, Nov. 13, 2014, pp. 1-386.

Amazon Web Services, "AWS Lambda: Developer Guide" 2018, pp. 1-539.

AWS, "Announcing Amazon EC2 Bare Metal Instances (Preview)", Retrieved from URL: https://aws.amazon.com/aboutaws/whats-new/2017/11/announcing-amazon-ec2-bare-metal-instances-preview/ on Jan. 15, 2018, pp. 1-4.

Brendan Gregg's Blog, "AWS EC Virtualization 2017: Introducing Nitro", Retrieved from URL: http://www.brendangregg.com/blog/2017-11-29/aws-ec2-virtualization-2017.html, pp. 1-11.

U.S. Appl. No. 16/698,698, filed Nov. 27, 2019, Derek Bolt, et al.

U.S. Appl. No. 16/698,732, filed Nov. 27, 2019, Jeffrey Paul Heckey, et al.

U.S. Appl. No. 16/698,737, filed Nov. 27, 2019, Christopher Kasprowicz, et al.

U.S. Appl. No. 18/478,772, filed Sep. 29, 2023, Ravi Kiran Chilakapati, et al.

(56) References Cited

OTHER PUBLICATIONS

International Search and Written Opinion dated Aug. 22, 2023 in PCT/US2022/074095, Amazon Technologies, Inc., pp. 1-10.
Seth Copen Goldstein, et al: "Linking", Carnegie Mellon, Feb. 21, 2013, pp. 1-53, Retrieved from the Internet: URL:https://www.cs.cmu.edu/afs/cs/academic/class/15213-sl3/www/lectures/12-linking.pdf [retrieved on Aug. 8, 2023].
Alexey Svyatkovskiy, et al., "IntelliCode Compose: Code Generation using Transformer," ACM, found at arXiv:2005.08025v2 [cs.CL], pp. 1-11.
Thomas Haner, et al., "A Software Methodology for Computing Quantum Programs." Quantum Science and Technology 3 (2018) 02051.
U.S. Appl. No. 17/491,190, filed Sep. 30, 2021, Yunong Shi et al.
U.S. Appl. No. 18/471,692, filed Sep. 21, 2023, Yunong Shi et al.

\* cited by examiner

QUANTUM COMPUTING PROGRAM COMPILATION USING CACHED COMPILED QUANTUM CIRCUIT FILES

BACKGROUND

A service provider network may allow clients to access services that are implemented using resources at locations remote from the clients. Such services may be said to reside "in the cloud." Cloud-based quantum computing service may provide clients access to various quantum computing resources of quantum hardware providers (QHPs), which may or may not be the same companies or organizations as the service provider. Quantum computing utilizes the laws of quantum physics to process information. Compared to classical (binary) computers, quantum computers (or quantum processing units (QPUs)) work with quantum bits (or qubits). Qubits can experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances. By using superposition and entanglement, quantum computers have the potential to process information in new ways to solve computational problems that are beyond the reach of classical computers.

Figure 1:
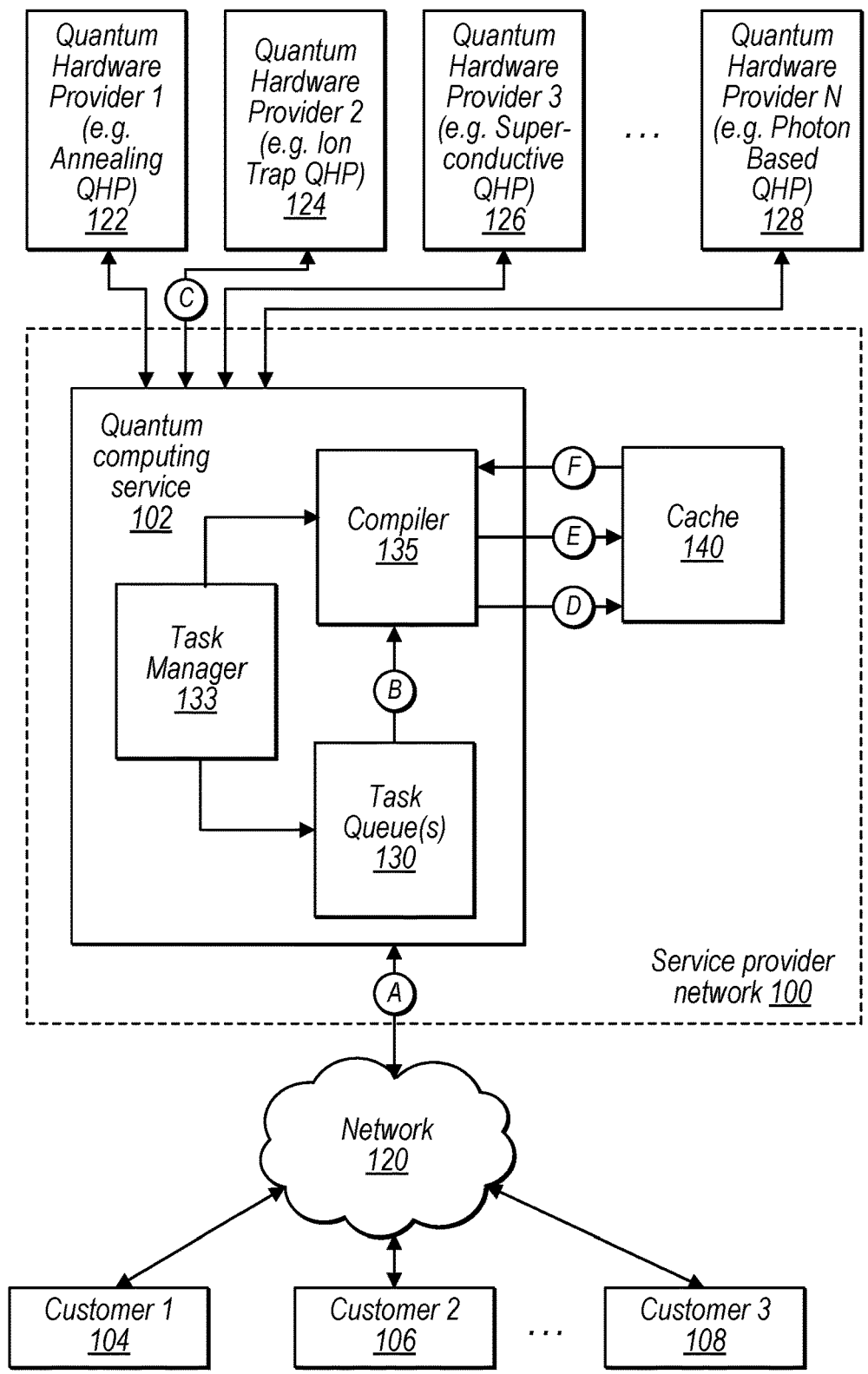
FIG. 1 shows an example quantum computing service that may use a cache to store compiled files of quantum functions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Quantum computers provided by quantum hardware providers may be implemented using different quantum computing technologies. For example, some quantum computers may include qubits built from superconductors, trapped ions, semiconductors, photonics, etc. A quantum computing program, generally written in a (high-level) source programming language, needs to be compiled into an executable version before it is executed on a quantum computer of a quantum hardware provider. The compiled version of the quantum computing program is in a format, such as in a machine language, in accordance with the quantum hardware of the quantum computer. The compilation of a source code to a compiled (executable) code may be time consuming and thus a considerable overhead added to cloud-based quantum computing.

Various embodiments described herein relate to techniques for reducing the amount of overhead associated with compilation of quantum computing programs in a cloud-based quantum computing service. In some embodiments, the quantum computing service may be implemented using one or more computing devices as part of a service provider network. For example, in some embodiments, a quantum computing service may be implemented using classical (binary) computers of the service provider network located at the same or different locations from customers, which may allow the customers to access various quantum computing resources of quantum hardware providers. In some embodiments, a quantum computing service may receive quantum computing programs from customers, cause the quantum computing programs to be compiled into compiled quantum circuits, and transport the compiled quantum computing programs to quantum hardware providers for execution. Upon completion of the execution of the compiled quantum computing programs comprising one or more compiled quantum circuits, results may be provided to the customers. In some embodiments, during compilation, one or more compiled quantum circuit files of one or more quantum functions in a quantum computing program may be generated, and stored by the quantum computing service, for example in a cache. The quantum computing service may then re-use the compiled quantum circuit files stored in the cache to compile future received quantum computing programs to cut down on an amount of overhead associated with compilation of the quantum computing program. For example, the quantum computing service may first receive a first quantum computing program written in a (high-level) source programming language for execution using a quantum processing unit of a quantum hardware provider. In some embodiments, the first quantum computing program may include one or more quantum functions, such as a Bell function to perform a Bell operation. The quantum computing service may store a compiled quantum circuit file for the Bell function (e.g. that is included in the first quantum computing program). For example, the compiled quantum circuit for the Bell function may be stored in a cache and an identifier for the compiled quantum circuit for the Bell function may be added to a database or other registry or directory of compiled quantum circuits that are stored in the cache. Next, the quantum computing service may receive an additional quantum computing program for execution using the quantum hardware provider. During compilation of the additional quantum computing program, the quantum computing service may parse the additional quantum computing program to determine whether the additional quantum computing program includes the Bell function, as was included in the first quantum computing program, where the Bell function is currently stored in the cache. If the additional quantum computing program also includes the Bell function, the quantum computing service may obtain the compiled quantum circuit file from the cache (instead of re-compiling the Bell function) and re-use the compiled quantum circuit file to generate a compiled version of the additional quantum computing program. Thus, repetition of quantum circuit compilation of at least one portion of the additional quantum computing program may be avoided. Accordingly, the amount of quantum circuit compilation and associated overhead may be reduced.

In some embodiments, a quantum computing service may use one cache per quantum computing customer, e.g., in a one-to-one mapping or single-customer mode. For example, a customer may opt in, or the quantum computing service may be set up, such that one cache is generated and used specifically for only one corresponding customer. Alternatively, in some embodiments, a cache may be generated and used to cache compiled quantum circuits available for use to compile quantum programs submitted by different customers, e.g., in a cross-customer mode. For example, compiled quantum circuit files generated from compilation of quantum computing programs of customer A may be re-used for the compilation of quantum computing programs of customer B, and vice versa. One benefit of the cross-customer mode may be that the compiled quantum circuit files in the cache may be built up more quickly (based on quantum computing programs received from more customers) and may be used to serve and benefit more customers. Further, in some embodiments, for a customer to be able to use the compiled quantum circuit files of another customer, the customer and/or the quantum computing service may need an authorization or license from the other customer. For example, a customer may allow (or dis-allow) specific ones of the compiled files in the cache, which are generated during compilation of quantum computing program(s) from the customer, to be shared with other customers, e.g., through an authorization code, a license, or other permission indications. Further, the customer may specify different levels of permission, e.g., one level of permission to allow a compiled file to be shared with another specific customer and another level of permission to allow another compiled file to be shared with any customers.

In some embodiments, a quantum computing service may store a cached version of a compiled quantum circuit for a whole quantum computing program or may store cached versions of portions of the quantum program as separately cached compiled quantum circuits. In some embodiments, a quantum program may be compiled using cached quantum circuit files for portions of the quantum program and, for other portions of the quantum program for which a compiled quantum circuit is not stored in a cache, additional quantum circuits may be compiled. Thus, a compiled quantum program may be formed using cached and non-cached compiled quantum circuits. In some embodiments, compiled quantum circuits generated in order to compile such a quantum program may be added to the cache, once compiled, and also added to a directory of compiled quantum circuits stored in the cache.

In some embodiments, the quantum functions of a quantum program for which the quantum computing service stores compiled quantum circuit files may have different levels of complexity. For example, in some embodiments, a quantum function may be a relatively simple function that may be represented by a single quantum logic gate, such as a Pauli-X (or X) gate. In addition, in some embodiments, a quantum function may include a more complex function, such as a Bell function (as in the above example) that may further include several less complex quantum functions, such as a Hadamard gate and a CNOT gate. In some embodiments, quantum hardware providers may use different quantum computing technologies to implement different types of quantum processing units (QPUs). For example, some quantum computers may include qubits built from superconductors, trapped ions, semiconductors, photonics, etc. As a result, the compiled quantum circuit file of a quantum function to be executed on a given QPU may need to be in the executable format (e.g., a binary file format) in accordance with the corresponding quantum hardware type of the given QPU. Thus, in some embodiments, a quantum computing service may store multiple compiled quantum circuit files for a single quantum function in different formats in accordance with quantum hardware types of QPUs offered by respective quantum hardware providers. Furthermore, in some embodiments, a previously received quantum computing program (e.g., the first quantum computing program in the above example) and the later received quantum computing program (e.g., the additional quantum computing program in the example) may or may not be written in the same source quantum programming language. For example, one quantum computing program may use a term "Bell function" whereas another quantum computing program represents the equivalent of a "Bell function" as a Hadamard gate and CNOT gate without assigning a particular label, such as "Bell function." In some embodiments, as long as both instances of the quantum function include the same quantum gates targeted to be executed on the same quantum hardware type, the compiled quantum circuit files of the different instances of the quantum function may be the same, and thus a compiled quantum circuit file generated from the previously received quantum computing program may be re-used to decrease the compilation overhead for the later received additional quantum computing program.

In some embodiments, compilation of a compiled quantum circuit may involve at least two compilation steps, such as compilation of a version of a quantum function using a native gate set that is native to a given QPU upon which the compiled quantum circuit is to be executed and compilation of a machine binary for instructing the various sensors and instruments of the given QPU to execute the compiled quantum function (e.g. to implement and execute the native gates). In some embodiments, a compiled native gate set may have a long validity life in a cache because the compiled native gate set is not dependent upon calibration data of the QPU. In contrast, a compiled machine binary for instructing the various sensors and instruments of the given QPU may have a shorter validity life in the cache because the compiled machine binary takes into account calibration data for the various sensors and instruments of the given QPU, which may drift or otherwise change over time.

In some embodiments, a cache of a quantum computing service may store compiled native gate sets, compiled machine binaries or both. In some embodiments, for a given quantum function, a quantum computing service may store a compiled native gate set for a given QPU and/or a compiled machine binary for the given QPU. In some embodiments, the compiled machine binary may be rendered invalid if one or more thresholds is met, such as expiration of a threshold amount of time, opening of a new access window for the QPU, and/or start of a new calibration of the quantum computer. However, the compiled native gate set may remain stored in the cache even if the compiled machine binary is rendered invalid. Thus, if a subsequent quantum program is received that includes the quantum function, a new machine binary may be compiled using current calibration data, but the steps of compiling the native gate set may be omitted by using the cached compiled native gate set for the given quantum function.

In some embodiments, a quantum hardware provider may provide compilation services and a cache of a quantum computing service may cache compiled quantum circuits that were compiled by a quantum hardware provider. For example, in some embodiments, a quantum computing service may submit a quantum program to a quantum hardware provider and receive back a compiled native gate set. The quantum computing service may then submit the compiled native gate set to the quantum hardware provider and receive back a compiled machine binary for a given QPU of the quantum hardware provider. The quantum computing service may then include the compiled machine binary for the given QPU in a task queue for quantum tasks to be executed on the given QPU. In some embodiments, the quantum computing service may cache the native gate set and/or the compiled to machine binary received from the quantum hardware provider and may re-use the cached files for subsequent quantum programs without having to re-submit the corresponding quantum functions to the quantum hardware provider to determine a compiled native gate set and/or a compiled machine binary for the respective quantum functions.

In some embodiments, the cache for storing compiled quantum circuits may be implemented as a centralized or a distributed system. For example, in some embodiments, the cache may be implemented as a centralized system residing at a centralized location, such as the quantum computing service. Alternatively, in some embodiments, the cache may include several caches distributed at different locations. For example, in some embodiments, the service provider network may include multiple edge computing devices located at respective locations of the quantum hardware providers. As a result, at least a portion of the cache storing compiled quantum circuit files in a format in accordance with the quantum hardware type of a quantum hardware provider may be implemented using the edge computing device(s) located at the same location of this quantum hardware provider. Further, in some embodiments, the cache for storing compiled quantum circuits may be implemented based on virtualized or non-virtualized storage using various storage devices, such as flash memory, hard drive disks, solid state drives, optical storage devices, etc.

In some embodiments, one or more of the compiled quantum circuit files in the cache may be associated with validity periods in connection with calibration data of corresponding quantum computers of the quantum hardware providers (e.g. QPUs). Calibration is a process to measure parameters of a quantum computer to reduce errors and decoherence in quantum computing. In some embodiments, quantum hardware providers may frequently update, calibrate, and/or modify their respective quantum computers. Because of these frequent changes, benchmarking results may quickly become obsolete. For example, benchmarking results for a quantum computer performed on a given day when the quantum computer is recently calibrated may quickly become obsolete after a few days, hours, or even minutes as the quantum computer varies from the calibrated state. In some embodiments, a quantum hardware provider may calibrate a QPU when providing an access window that makes the QPU available to execute quantum programs. Thus, a compiled file created using calibration data for benchmarking results at a given point-in-time may not be valid at a later point in time when the QPU has drifted from the calibration data determined based on the previously determined benchmarking results. As a result, in some embodiments, the quantum computing service may recognize validity periods of the compiled quantum circuit files stored in the cache, and render them invalid upon a determination of expiration of their respective validity periods. As described above, a validity period may be determined expired if one or more thresholds is met, such as expiration of a threshold amount of time, opening of a new access window for the QPU, and/or start of a new calibration of the quantum computer. Depending on the quantum hardware and/or calibration measurement techniques, in some embodiments, the validity period of a quantum computer may last from seconds, minutes, hours, up to days. An invalid compiled quantum circuit file may not be re-used for compilation of future quantum computing programs. In some embodiments, after a compiled quantum circuit file for one quantum functions becomes invalid, the quantum computing service may monitor for the quantum functions in future received quantum computing programs. When the same quantum function is compiled for a subsequently received quantum program using updated calibration data, the quantum computing service may cause a new compiled file of the quantum function to be generated and stored in the cache to replace the expired compiled quantum circuit stored file in the cache. In some embodiments, an invalid compiled quantum circuit file may be removed from the cache.

FIG. 1 shows an example quantum computing service that may use a cache to store compiled files of quantum functions, according to some embodiments. In FIG. 1, service provider network 100 may include quantum computing service 102. In some embodiments, quantum computing service 102 may be implemented using one or more computing devices, such as classical (binary) computers, of service provider network 100. In some embodiments, service provider network 100 may also include other devices such as storage devices, routers, networking devices, etc. and provide other cloud-based services such as database and storage services, networking services, etc. Quantum computing service 102 may provide one or more customers 104, 106, and 108 access to quantum computing resources of various quantum hardware providers 122, 124, 126, and 128. In some embodiments, customers 104, 106, and 108 may access quantum computing service 102 via network 120, such as a logically isolated connection over a public network, a dedicated private physical connection (not accessible to the public), a public Internet connection, etc. In some embodiments, quantum hardware providers 122, 124, 126, and 128 may allow quantum computing programs to be executed on quantum computers based on various different types of quantum computing technologies or paradigms, such as quantum annealers, ion trap machines, superconducting machines, photonic devices, etc. In some embodiments, quantum computing service 102 may provide customers with access to at least three broad categories of quantum computers including quantum annealers, circuit-based quantum computers, and analog or continuous variable quantum computers.

For purposes of illustration, example interactions between a customer and a quantum hardware provider, through quantum computing service 102, may be described in the following steps. For instance, in some embodiments, at "step A" quantum computing service 102 may receive a first quantum computing program from a customer (e.g., customer 104), e.g., via an interface, for execution using a quantum hardware provider (e.g., quantum hardware provider 124). In some embodiments, the interface may be a graphic interface on a website, an interface for command line input (CLI), an application programming interface (API), software development kit (SDK), etc. that allows a customer to access quantum computing service 102 via network 120. In some embodiments, the first quantum computing program may be stored temporarily at task queue(s) 130 of quantum computing service 102.

In some embodiments, the quantum computing program may be written in or represented by a generic source programming language. For instance, in some embodiments, when a developer uses a software development kit, the quantum computing program submitted by the developer to quantum computing service 102 may be represented by a graphic diagram including one or more quantum function blocks in a generic source programming language visible to the developer (e.g., QCL, QASM, OpenQASM, Q #, Quil, Quipper, etc.). In some embodiments, quantum computing service 102 may first translate the quantum computing program to a gate-level program file, such as a Quil file, that replaces the quantum computing program with one or more quantum logic gates. Alternatively, in some embodiments, a developer may directly use a gate-level source programming language (e.g., when using a software development kit (SDK) such as PyQuil) to write a quantum computing program. In some embodiments, such gated-level program files may include generic (or standard) quantum logic gates that may not be actually offered by a given quantum computer. Thus, in some embodiments, the generic gate-level program file may be further translated to a native gate-level program file (e.g., a native Quil file) based on natural gate sets of the specific quantum computer.

The translated first quantum computing program that has been translated into the generic gate-level program file may not necessarily be "understood" by the quantum computer of quantum hardware provider 124. Thus, in some embodiments, at "step B" task manager 133 may direct task queue(s) 130 to send the first quantum computing program to compiler 135 for compilation. During the compilation, compiler 135 may parse this quantum computing program, generate compiled files of individual quantum functions included or called in the quantum computing program, and link these compiled files in to a compiled code. The compiled quantum computing program or code may be in the format (e.g., a binary file format) in accordance with the quantum hardware of the quantum computer, and thus executable on the quantum computer of quantum hardware provider 124. In other words, a quantum computing program in a generic, gate-level or non gate-level, source programming language (e.g., QCL, QASM, OpenQASM, Q #, Quil, Quipper, using PyQuil, etc.) represents a target quantum computing task in a portable language format that may be developed and visible on various computing devices. The translation of the quantum computing program to a native gate-level program file (e.g., native Quil file) converts the representation of the target quantum computing task from the portable language format to a native language format that may be specific to a given type of a quantum computer. And the compilation of the native gate-level program file to a compiled quantum circuit file that is directly executable on a given quantum computer is like encoding the target quantum computing task from the native, quantum hardware-specific representation to a machine language representation that may be "understood" and executed directly on the given quantum computer.

In some embodiments, at step "C" the compiled quantum computing program may be transported to quantum hardware provider 124 for execution, and in return a result may be provided to customer 104. In some embodiments, at "step D" compiler 135 of quantum computing service 102 may store one or more of the compiled files of the quantum functions of the first quantum computing program in cache 140. As indicated in FIG. 1, in some embodiments, cache 140 may reside within service provider network 100, but outside quantum computing service 102. For instance, cache 140 may be implemented using one or more edge computing devices of service provider network 100 located at the locations of respective quantum hardware providers 122, 124, 126, and 128, such as providing a distributed cache system. In this example, given the compiled files is in the format compatible with the quantum hardware of quantum hardware provider 124, the compiled file may thus be stored in the edge computing device(s) at the location of quantum hardware provider 124. Alternatively, in some embodiments, cache 140 may be implemented using computing device(s) of quantum computing service 102 and thus reside within quantum computing service 102, e.g., providing a centralized cache system. In some embodiments, the edge computing devices may also be part of quantum computing service 102. In addition, in some embodiments, at "step D"

compiler 135 of quantum computing service 102 may also store one or more of the (translated) native gate-level program files of one or more quantum functions of the first quantum computing program in cache 140 or another cache. Alternatively, in some embodiments, at "step D" compiler 135 may store only the (translated) native gate-level program files, not the compiled binary files, in a cache.

In some embodiments, the quantum functions for which quantum computing service 102 stores compiled files may include quantum functions of different levels of complexity. For example, in some embodiments, a quantum function may be a relatively simple function that may be represented by a single quantum logic gate, such as a Pauli-X (or X) gate, a Hadamard (or H) operator, etc. In addition, in some embodiments, a quantum function may include a more complex function, such as a Bell function, a quantum Fourier transformer (QFT) function, etc. that may include and be built on top of other quantum functions or logic gates. For purposes of illustration, in this example, it is assumed that quantum computing service 102 stores a compiled file of a Bell function from the first quantum computing program in cache 140. In addition, in some embodiments, the compiled files in cache 140 may be each associated with an identifier, e.g., a hash value created based on the name and parameter(s) (or argument(s)) of the corresponding quantum function. For example, in some embodiments, cache 140 may include a database that may include identifiers, e.g., one or more relational tables, hash tables, or other forms of a database structures that organize identifiers for cached compiled quantum circuits. A compiled quantum circuit file and associated identifier (e.g., a hash value of the compiled quantum circuit file) or other information may be stored as records in the database of cache 140. Consider the Bell function as an example, the identifier for its compiled quantum circuit file in cache 140 may be a hash value of the string Bell (0, 1) or Bell. Alternatively, in some embodiments, the identifier for a compiled quantum circuit file may simply be the name of the quantum function, such as the string Bell, or use other information of the quantum function. In some embodiments, the identifier of a compiled quantum circuit file may also be associated with an identifier of the quantum computer type (e.g. QPU) upon which the compiled quantum circuit has been compiled to execute, such as quantum computer #1 of quantum hardware provider 124. This way, compiler 135 may be able to recognize if a compiled file is in the format compatible with the quantum hardware of a given quantum computer of a given quantum hardware provider.

In some embodiments, quantum computing service 102 may receive an additional quantum computing program from the customer or another customer for execution using quantum hardware provider 124, and the additional quantum computing program may be sent to compiler 135 for compilation, like "step A" and "step B" described above. The customer may be the same customer (e.g., customer 104) of the first quantum computing program in a single-customer mode, or alternatively a different customer (e.g., customer 108) in a cross-customer mode. Either way, the following steps may be performed in a substantially similar manner. But for purposes of illustration, it is considered that the additional quantum program may be received from a different customer such as customer 108 in this example.

In some embodiments, at "step B" during compilation of the additional quantum computing program, compiler 135 may parse the additional quantum computing program to determine whether it includes any of the quantum functions that have compiled files stored in cache 140. In some embodiments, this determination may be based on examining whether the second quantum computing program has a quantum function of set of quantum gates that match an identifier indicating any of the quantum functions in cache 140. For example, when the additional quantum computing program includes such quantum functions, compiler 135 may compute hash values of these quantum functions to determine whether any of them match the hash values for compiled quantum circuits stored in cache 140. When, as an example, a match is identified with the hash value for the Bell function in cache 140, compiler 135 may determine that the Bell function in the additional quantum computing program is stored in cache 140.

At "step E" and "step F" when it is determined that the additional quantum computing program includes a same quantum function, e.g., the Bell function, compiler 135 may obtain the corresponding compiled quantum circuit file from cache 140, and re-use the compiled file to generate a compiled file for the additional quantum computing program. When cache 140 uses a database to store the compiled file and associated identifier, the retrieval of the compiled file from cache 140 may be implemented using any appropriate database query techniques. At "step C" the compiled second quantum computing program may be transported from quantum computing service 102 to quantum hardware provider 124 for execution, and in return a result may be provided to customer 108. As described herein, quantum computing service may be able to re-use a previously compiled file (from the first quantum computing program) to compile the second quantum computing program. Thus, repetition of compilation of at least one portion of the second quantum computing program may be avoided. As a result, the amount of compilation and associated overhead may be reduced. In some embodiments, at "step E" and "step F" compiler 135 may fetch one or more (translated) native gate-level program files of one or more matched quantum functions from cache 140 or another cache to accelerate the compilation process of the second quantum computing program. For instance, compiler 135 may retrieve a native gate-file of a quantum function that was generated for one quantum computer of quantum hardware provider 124, and use it to facilitate the creation of the compiled file of the quantum computing program for another quantum computer of quantum hardware provider 124, wherein both quantum computers of quantum hardware provider 124 use the same native gates. Note that in some embodiments, the stored native gate-level program files may not necessarily include information of the calibration data of a given quantum computer (e.g. QPU).

As described above, in some embodiments, quantum computers may need to be calibrated to reduce errors and decoherence in the quantum computing, and the compilation of the quantum computing program may be connected with the calibration data of a quantum computer. Thus, in some embodiments, the compiled files in cache 140, e.g., for the Bell function as an example, may be associated with respective validity periods. In some embodiments, the validity periods may last from seconds, minutes, hours, up to days, depending on the corresponding quantum computer and/or calibration measurements. In some embodiments, quantum computing service 102 may recognize that the compiled files in cache 140 are associated with the validity periods, and render a compiled file invalid upon a determination of expiration of its validity period. In some embodiments, the compiled file of the Bell function (from the first quantum computing program) in cache 140 may have already expired when quantum computing service 140 receives the additional quantum computing program. As a result, quantum computing service 102 may not re-use the expired (or invalid) compiled file to compile the additional quantum computing program. Instead, compiler 135 may generate a new compiled file of the Bell function, as an example, during compilation of the additional quantum computing program, and use the newly generated compiled file to compile the at least a portion of the additional quantum computing program. Further, in some embodiments, compiler 135 may store the newly generated compiled file in cache 140 (to replace the expired compiled file), like "step D" described above.

Further, as described above, the format of the compiled file of a quantum function may need to be compatible with the quantum hardware, such that the compiled file may be a binary file that is "understood" and executable directly on the corresponding quantum computer. In other words, a compiled file for one type of quantum hardware may not be executable on another type of quantum hardware. In some embodiments, the second quantum computing program from customer 108 may be targeted to a different quantum computer, e.g., one of quantum hardware provider 128, rather than the same quantum computer of quantum hardware provider 122 for customer 104. In that case, quantum computing service 102 may not be able to re-use the compiled file in cache 140 (from customer 104) to compile the second quantum computing program (from customer 108), because the compiled codes need to be in different formats. As a result, compiler 135 may generate a new compiled file of the Bell function, as an example, during compilation of an additional quantum computing program, and use the newly generated compiled file to compile the second quantum computing program. Further, in some embodiments, compiler 135 may store the newly generated compiled file in cache 140 (for quantum hardware provider 128), like "step D" described above. Alternatively, in some embodiments, compiler 135 of quantum computing service 102 may proactively generate and store one or more compiled files of one or more quantum functions for a quantum computer, even if the quantum functions have not been seen by the quantum computer. For instance, in some embodiments, task manager 133 may examine the quantum computing programs submitted from previous customers, and decide that one or more particular quantum functions are commonly used in those quantum computing programs. In response, task manager 133 may instruct compiler 135 to proactively generate compiled files for these particular quantum functions for a quantum computer, even though the previous quantum computing programs including these particular quantum functions were not specifically submitted for execution on this quantum computer. In a later time, these compiled files may be used to compile a quantum computing program, when they are detected to include the particular quantum functions, when the later received quantum computing program is submitted for execution using the quantum computer. For example, a task manager 133 may receive a quantum function to be executed on a first QPU and may proactively compile and cache multiple versions of the function such as a version for execution on the first QPU and additional versions for execution on other QPUs. In some embodiments, the proactively complied and cached quantum circuits may be for a same type of quantum hardware, but taking into account different calibration data, or may be for different types of quantum hardware.

Figure 2:
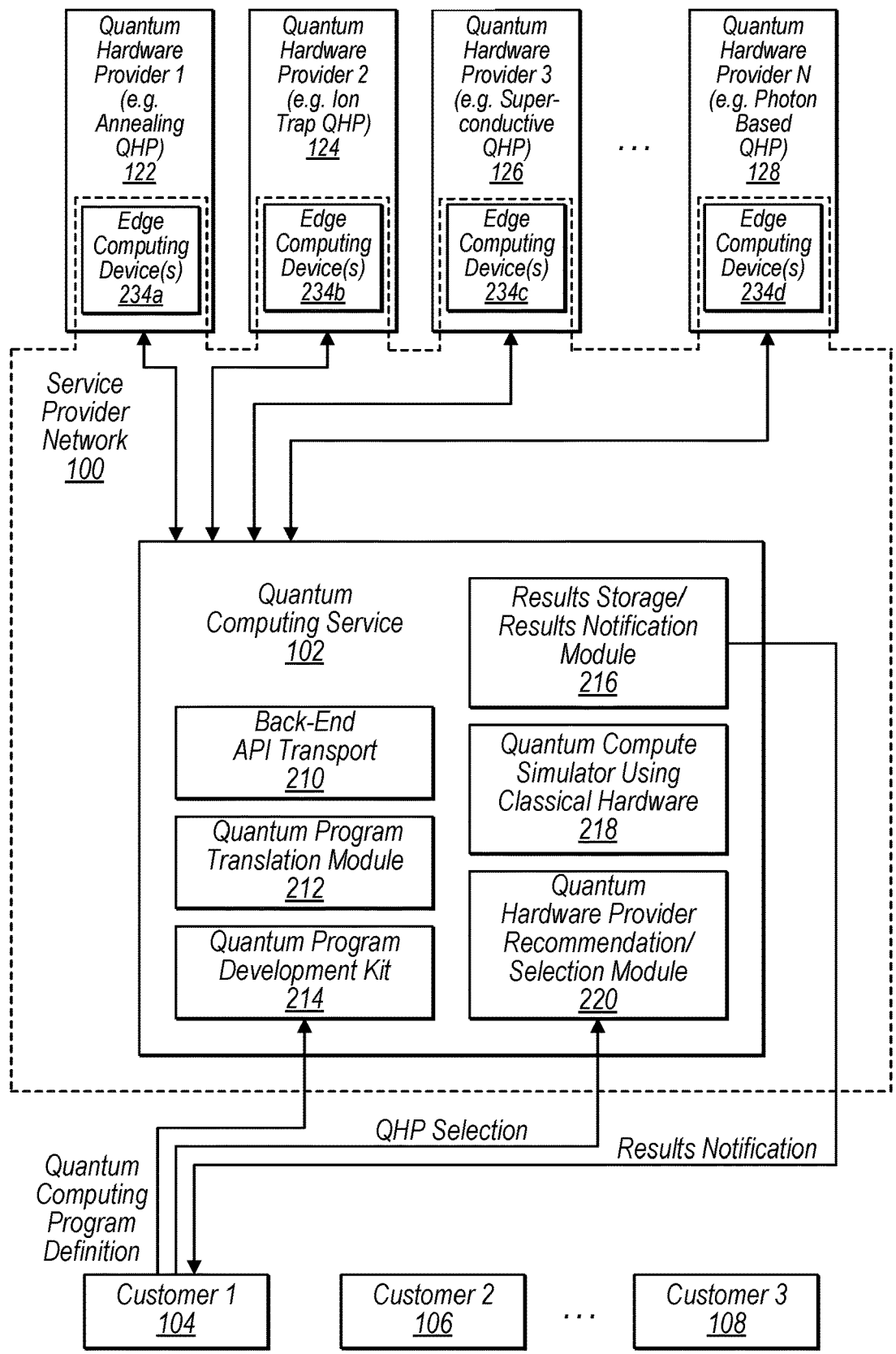
FIG. 2 shows an example quantum computing service that may enable customers to access quantum computers using multiple quantum computing technologies, according to some embodiments.

FIG. 2 shows an example quantum computing service that may enable customers to access quantum computers using multiple quantum computing technologies, according to some embodiments. In some embodiments, quantum computing service 102 may be included as part of service provider network 100. In some embodiments, service provider network 100 may include data centers, routers, networking devices, etc., such as of a cloud computing provider network. In some embodiments, customers 104, 106, and 108 and/or additional customers of service provider network 100 and/or quantum computing service 102, may be connected to service provider network 100 in various ways, such as via a logically isolated connection over a public network, via a dedicated private physical connection, not accessible to the public, via a public Internet connection, etc. Also, quantum computing service 102 may be connected to quantum hardware providers 122, 124, 126, and 128. In some embodiments, quantum hardware providers 122, 124, 126, and 128 may offer access to run quantum objects on quantum computers that operate based on various different types of quantum computing technologies or paradigms, such as quantum annealers, ion trap machines, superconducting machines, photonic devices, etc.

In some embodiments, quantum computing service 102 may include quantum program development kit 214. Quantum program development kit 214 may provide a programming environment and/or tools to allow a customer to develop a quantum computing program. For example, in some embodiments, quantum program development kit 214 may provide a problem-domain based paradigm for defining a quantum computing program as a quantum circuit in an interactive graphic interface. A customer may select a problem-domain quantum task provided by quantum program development kit 214 to display a problem-domain based interface for designing a quantum circuit. The problem-domain based interface may include pre-configured quantum algorithms designed for performing particular functions associated with one or more respective problem domains.

Also, in some embodiments, quantum computing service 102 may include translation module 212. Translation module 212 may translate the quantum computing program (e.g., represented by the quantum circuit) developed in quantum program development kit 214 from a gate or non-gate level generic source programming language file, such as QCL, QASM, OpenQASM, Q #, Quil, Quipper, etc., to a native gate-level program file (e.g., a native Quil file) specific to different types of quantum hardware.

In some embodiments, service provider network 100 may be extended to include one or more edge computing devices 234a, 234b, 234c, and 234d physically located at quantum hardware provider locations, such as in a facility of quantum hardware providers 122, 124, 126, and 128. Physically locating an edge computing device of a service provider network 100 on premises at a quantum hardware provider facility may extend data security and encryption of the service provider network 100 into the quantum hardware providers 122, 124, 126, and 128 facilities, thus ensuring the security of customer data. Also, physically locating an edge computing device of a service provider network 100 on premises at a quantum hardware provider facility may reduce latency between a compute instance of the service provider network and a quantum computer located at the quantum hardware provider facility.

In some embodiments, quantum computing service 102 may include back-end API transport module 210. In some embodiments, back-end API transport module 210 may be primarily implemented on edge computing devices 234a, 234b, 234c, and 234d of service provider network 100 that are located at the quantum hardware provider locations. Also, in some embodiments, at least some functionalities of back-end API transport module 210 may be implemented on the one or more computing devices of service provider network 100 that implement quantum computing service 102 (thus residing within quantum computing service 102).

Quantum computing programs that have been translated by translation module 212 (to a native language) may be provided to back-end API transport module 210 in order for the translated quantum computing programs to be compiled into executable code and transported to a quantum computer at a respective quantum hardware provider location for execution. In some embodiments, back-end API transport 210 may be a non-public API that is accessible by an edge computing device of service provider network 100, but that is not publicly available. In some embodiments, edge computing devices 234a, 234b, 234c, and 234d at quantum hardware providers 122, 124, 126, and 128 may periodically ping a quantum computer service side interface to back-end API transport 210 to determine if there are any compiled quantum computing programs waiting to be transported to the edge computing device. If so, the edge computing device may perform an API call to back-end API transport 210 to cause the translated quantum computing programs to be transported over a private connection to the edge computing device and scheduled for execution on a quantum computer. In some embodiments, back-end API transport module 210 may implement one or more queues (e.g., task queue(s) 130 in FIG. 1) to queue the translated quantum computing program for execution on a quantum computer of the quantum hardware provider where the edge computing device is located. Also, back-end API transport module 210 may implement a task manager (e.g., task manager 133 in FIG. 1) configured with a quantum machine image that enables an edge computing device to interface with a scheduling application of the quantum hardware provider, where the edge computing device is located, in order to schedule a time slot on the quantum computer of the quantum hardware provider to execute the quantum circuit via the back-end API transport 210.

In some embodiments, quantum computing service 102 may implement one or more quantum computing compilers (e.g., compiler 135 in FIG. 1) to compile quantum computing programs into executable formats (e.g., into machine languages) for execution on the quantum computers of quantum hardware providers 122, 124, 126, and 128. In some embodiments, there may be multiple compilers individually responsible for compiling quantum computing programs for respective quantum hardware providers 122, 124, 126, and 128. In addition, in some embodiments, the compilers may be implemented to reside on computing devices within back-end API transport 210 or edge computing devices 234a, 234b, 234c, and 234d. Note that, in some embodiments, back-end API transport 210 may also be primarily implemented on edge computing devices 234a, 234b, 234c, and 234d. When quantum computing service 102 operates multiple compilers respectively for quantum hardware providers 122, 124, 126, and 128, individual ones of the compilers may reside within respective edge computing devices at quantum hardware providers 122, 124, 126, and 128. For example, quantum computing service 102 may implement a first compiler on edge computing device 234a for quantum hardware providers 122, a second compiler on edge computing device 234b for quantum hardware providers 124, a third compiler on edge computing device 234c for quantum hardware providers 126, and a fourth compiler on edge computing device 234d for quantum hardware providers 128.

In addition, in some embodiments, quantum computing service 102 may implement a cache (e.g., cache 140 in FIG. 1) to store compiled files of quantum functions generated during compilation of the quantum computing programs. As described above, in some embodiments, the cache may be a centralized catch system (e.g., including a centralized database), e.g., implemented at a centralized location on computing devices of back-end API transport 210. Alternatively, in some embodiments, the cache may be a distributed cache system (e.g., including a distributed database). For example, the cache may include multiple caches implemented on respective edge computing devices 234a, 234b, 234c, and 234d at the locations of quantum hardware providers 122, 124, 126, and 128. In that case, each edge computing device may be responsible to store only the compiled files in a format compatible with the quantum hardware of the corresponding quantum hardware provider.

As described above, in some embodiments, when back-end API transport 210 receives a (translated) quantum computing program from translation module 212, back-end API transport 210 may determine whether the quantum computing program includes a quantum function that has a corresponding compiled file in the cache. In some embodiments, this may be performed based on determining whether the quantum computing program references an identifier indicating any of the quantum functions in the cache. For example, a compiler of quantum computing service 102 may parse the quantum computing program, identify the included quantum functions, compute respective hash values, and examine whether any of the hash values matches the hash values stored in the cache. In response to a determination that the quantum computing program includes a matching quantum function, back-end API transport 210 may obtain the compiled file from the cache and re-use it to compile the quantum computing program. In some embodiments, the retrieval of the compiled file from the cache may include access of back-end API transport 210 to a cache on an edge computing device at the location of a quantum hardware provider. Next, back-end API transport 210 may transport the compiled quantum computing program to the quantum hardware provider for execution.

In some embodiments, results of executing the quantum computing program on the quantum computer at the quantum hardware provider location may be returned to the edge computing device at the quantum hardware provider location. The edge computing device and/or quantum computing service 102 may cause the results to be stored in a data storage system of the service provider network 100, as discussed in more detail in FIG. 3. In some embodiments, results storage/results notification module 216 may coordinate storing results and may notify a customer, such as customer 104, that the results are ready from the execution of the customer's quantum object, such as a quantum computing program or quantum circuit. In some embodiments, results storage/results notification module 216 may cause storage space in a data storage service to be allocated to a customer to store the customer's results. Also, the results storage/results notification module 216 may specify access restrictions for viewing the customer's results in accordance with customer preferences.

In some embodiments, quantum compute simulator using classical hardware 218 of quantum computing service 102, may be used to simulate a quantum computing program or quantum circuit using classical hardware. For example, one or more virtual machines of a virtual computing service, such as virtual computing service 326 illustrated in FIG. 3, may be instantiated to process a quantum computing program or quantum circuit simulation job. In some embodiments, quantum compute simulator using classical hardware 218 may fully manage compute instances that perform the simulation. For example, in some embodiments, a customer may submit a quantum computing program to be simulated and quantum compute simulator using classical hardware 218 may determine resources needed to perform the simulation job, reserve the resources, configure the resources, etc. In some embodiments, quantum compute simulator using classical hardware 218 may include one or more "warm" simulators that are pre-configured simulators such that they are ready to perform a simulation job without a delay typically involved in reserving resources and configuring the resources to perform simulation In some embodiments, quantum computing service 102 includes quantum hardware provider recommendation/selection module 220. In some embodiments, quantum hardware recommendation/selection module 220 may make a recommendation to a quantum computing service customer as to which type of quantum computer or which quantum hardware provider to use to execute a quantum object submitted by the customer. Additionally, or alternatively, the quantum hardware provider recommendation/selection module 220 may receive a customer selection of a quantum computer type and/or quantum hardware provider to use to execute the customer's quantum object, such as a quantum computing program or quantum circuit, etc. submitted by the customer or otherwise defined with customer input.

In some embodiments, a recommendation provided by quantum hardware provider recommendation/selection module 220 may be based on one or more characteristics of a quantum computing program submitted by a customer and one or more characteristics of the quantum hardware providers supported by the quantum computing service 102, such as one or more of quantum hardware providers 122, 124, 126, and 128.

In some embodiments, quantum hardware provider recommendation/selection module may make a recommendation based on known data about previously executed quantum objects similar to the quantum object submitted by the customer. For example, quantum computing service 102 may store certain amounts of metadata about executed quantum objects and use such metadata to make recommendations. In some embodiments, a recommendation may include an estimated cost to perform the quantum computing task by each of the first and second quantum hardware providers. In some embodiments, a recommendation may include an estimated error rate for each of the first and second quantum hardware providers in regard to performing the quantum computing task. In some embodiments, a recommendation may include an estimated length of time to execute the quantum computing task for each of the first and second quantum hardware providers. In some embodiments, a recommendation may include various other types of information relating to one or more quantum hardware providers or any combination of the above.

In some embodiments, quantum compute simulator using classical hardware 218, may allow a customer to simulate one or more particular quantum computing technology environments. For example, a customer may simulate a quantum computing program in an annealing quantum computing environment and an ion trap quantum computing environment to determine simulated error rates. The customer may then use this information to make a selection of a quantum hardware provider to use to execute the customer's quantum computing program.

Figure 3:
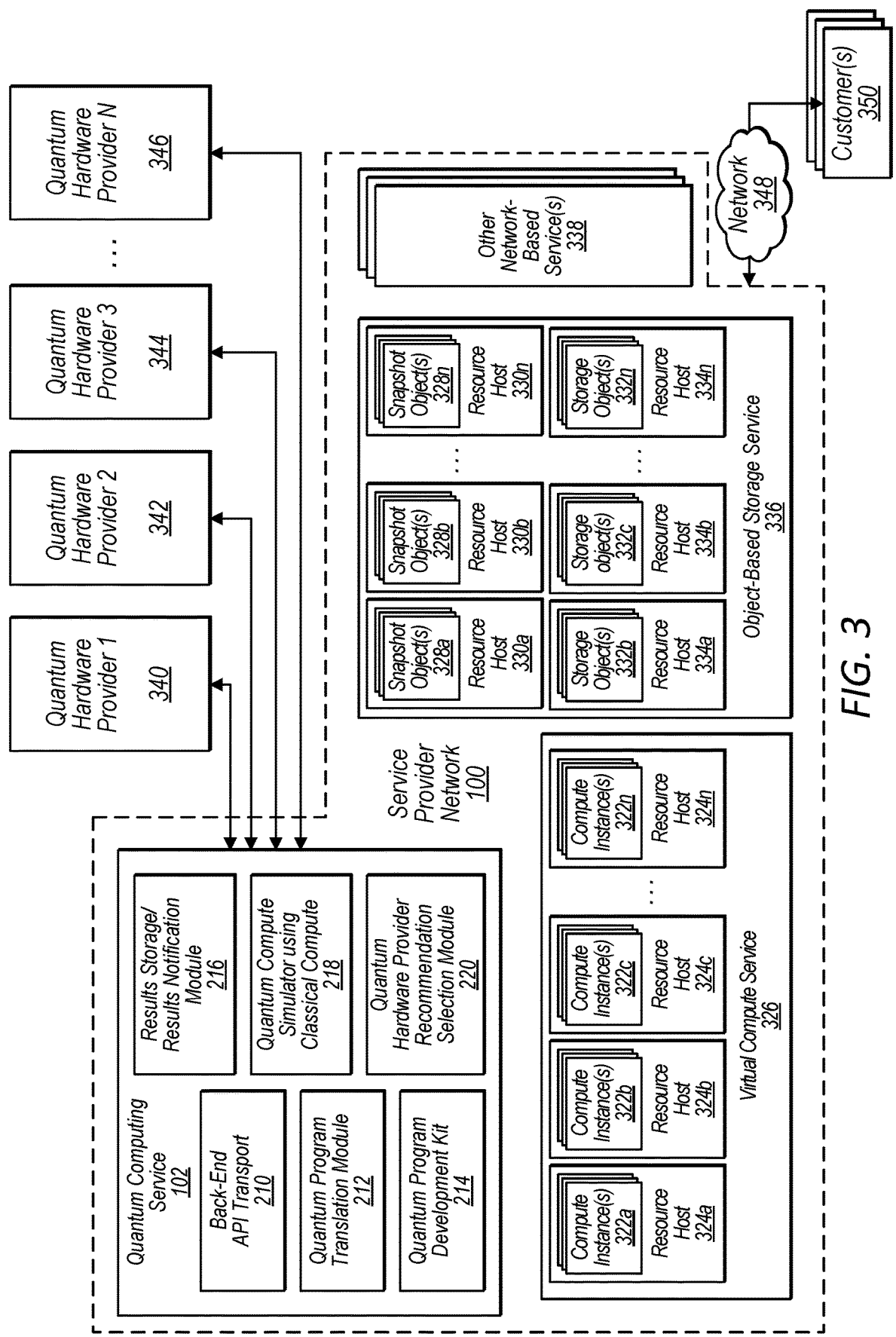
FIG. 3 illustrates a service provider network comprising a quantum computing service, virtual computing service, and storage service, according to some embodiments.

FIG. 3 illustrates a service provider network comprising a quantum computing service, virtual computing service, and storage service, according to some embodiments. Service provider network 100 as illustrated in FIGS. 1, 2, and 3 may be set up by an entity such as a company or a public sector organization to provide one or more services (such as various types of cloud-based computing or storage) accessible via the Internet and/or other networks to customers 350. Service provider network 100 may include numerous data centers hosting various pools of resource hosts, such as collections of physical and/or virtualized computer servers, storage devices, networking equipment and the like (e.g., computing system 900 described below with regard to FIG. 9), needed to implement and distribute the infrastructure and services offered by the service provider network 100. In some embodiments, service provider network 100 may provide computing resources, such as virtual compute service 326, storage services, such as object-based storage service 336 (which may include various storage types such as object/key-value based data stores or various types of database systems), and/or any other type of network-based services 338. Customers 350 may access these various services offered by provider network 100 via network 348. Likewise, network-based services may themselves communicate and/or make use of one another to provide different services. For example, computing resources offered to customers 350 in units called "instances," such as virtual or physical compute instances or storage instances, may make use of other resources, such as data stored in object based data storage service 336 for the compute instances 322a, 322b, 322c and 322c.

As noted above, virtual compute service 326 may offer various compute instances to customers 350. In some embodiments, such compute instances may be instantiated on an edge computing device located at a quantum hardware provider location. For example, in some embodiments, one or more of resource hosts 324a, 324b, 324c, or 324n may be an edge computing device located at a quantum hardware provider location, such as a location of quantum hardware providers 340, 342, 344, and/or 346. Additionally, a virtual compute instance (e.g., virtual machine) may, for example, be implemented on one or more resource hosts 324 that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 326 in different embodiments, including special purpose computer servers, storage devices, network devices and the like, such as edge computing devices located at a quantum hardware provider location. In some embodiments instance customers 350 or any other user may be configured (and/or authorized) to direct network traffic to a compute instance. In various embodiments, compute instances may attach or map to one or more data volumes provided by a block-based storage service in order to obtain persistent block-based storage for performing various operations.

Compute instances may operate or implement a variety of different platforms, such as general purpose operating systems, application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the customer 350 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. and (in the case of reserved compute instances) reservation term length.

In some embodiments, an object-based storage service, such as object-based storage service 336, may include a plurality of resource hosts that store snapshot objects and/or other storage objects. For example, object-based storage service 336 includes resource hosts 330a and 330b through 330n storing snapshot objects 328a and 328b through 328n. Additionally, object-based storage service 336 includes resource hosts 334a and 334b through 334n storing storage objects 332a and 332b through 332n. For ease of illustration, snapshot objects 328 and storage objects 332 are illustrated as being stored on different resource hosts of object-based storage service 336. However, in some embodiments a same resource host of an object-based storage service, such as a resource host 330 of object-based storage service 336 may store both storage objects and snapshot objects, for example from a snapshot taken of intermediate results of execution of a hybrid algorithm, from final results from the execution of a of quantum computing object, or from a machine image used by a target volume of a block-based storage service to boot a compute instance, such as one of compute instances 322. Also, a resource host 330 of object-based storage service 336 may store one or more quantum machine images used to boot a compute instance at an edge computing device that coordinates scheduling execution of quantum objects on quantum computer at a quantum hardware provider location where the edge computing device is located.

In addition, service provider network 100 may implement other network-based services 338, which may include various different types of analytical, computational, storage, or other network-based system allowing customers 350, as well as other services of provider network 100 (e.g., a block-based storage service, virtual compute service 326 and/or object-based storage service 336) to perform or request various tasks.

Customers 350 may encompass any type of client configurable to submit requests to network provider 100. For example, a given customer 350 may include a suitable version of a web browser, or may include a plug-in module or other type of code module configured to execute as an extension to or within an execution environment provided by a web browser. Alternatively, a customer 350 may encompass an application such as a database application (or user interface thereof), a media application, an office application or any other application that may make use of compute instances 322, quantum compute service 102, or other network-based service in provider network 100 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, customers 350 may be configured to generate network-based services requests according to a Representational State Transfer (REST)-style network-based services architecture, a document- or message-based network-based services architecture, or another suitable network-based services architecture. In some embodiments, a customer 350 (e.g., a computational client) may be configured to provide access to a compute instance 322 or data storage object 332 in a manner that is transparent to applications implemented on the customer 350 utilizing computational resources provided by the compute instance 322 or storage provided by the storage object 332.

Customers 350 may convey network-based services requests to service provider network 100 via external network 348. In various embodiments, external network 348 may encompass any suitable combination of networking hardware and protocols necessary to establish network-based communications between customers 350 and service provider network 100. For example, a network 348 may generally encompass the various telecommunications networks and service providers that collectively implement the Internet. A network 348 may also include private networks such as local area networks (LANs) or wide area networks (WANs) as well as public or private wireless networks. For example, both a given customer 350 and service provider network 100 may be respectively provisioned within enterprises having their own internal networks. In such an embodiment, a network 348 may include the hardware (e.g., modems, routers, switches, load balancers, proxy servers, etc.) and software (e.g., protocol stacks, accounting software, firewall/security software, etc.) necessary to establish a networking link between given customer 350 and the Internet as well as between the Internet and service provider network 100. It is noted that in some embodiments, customers 350 may communicate with service provider network 100 using a private network rather than the public Internet, such as a direct connection.

Figure 4A:
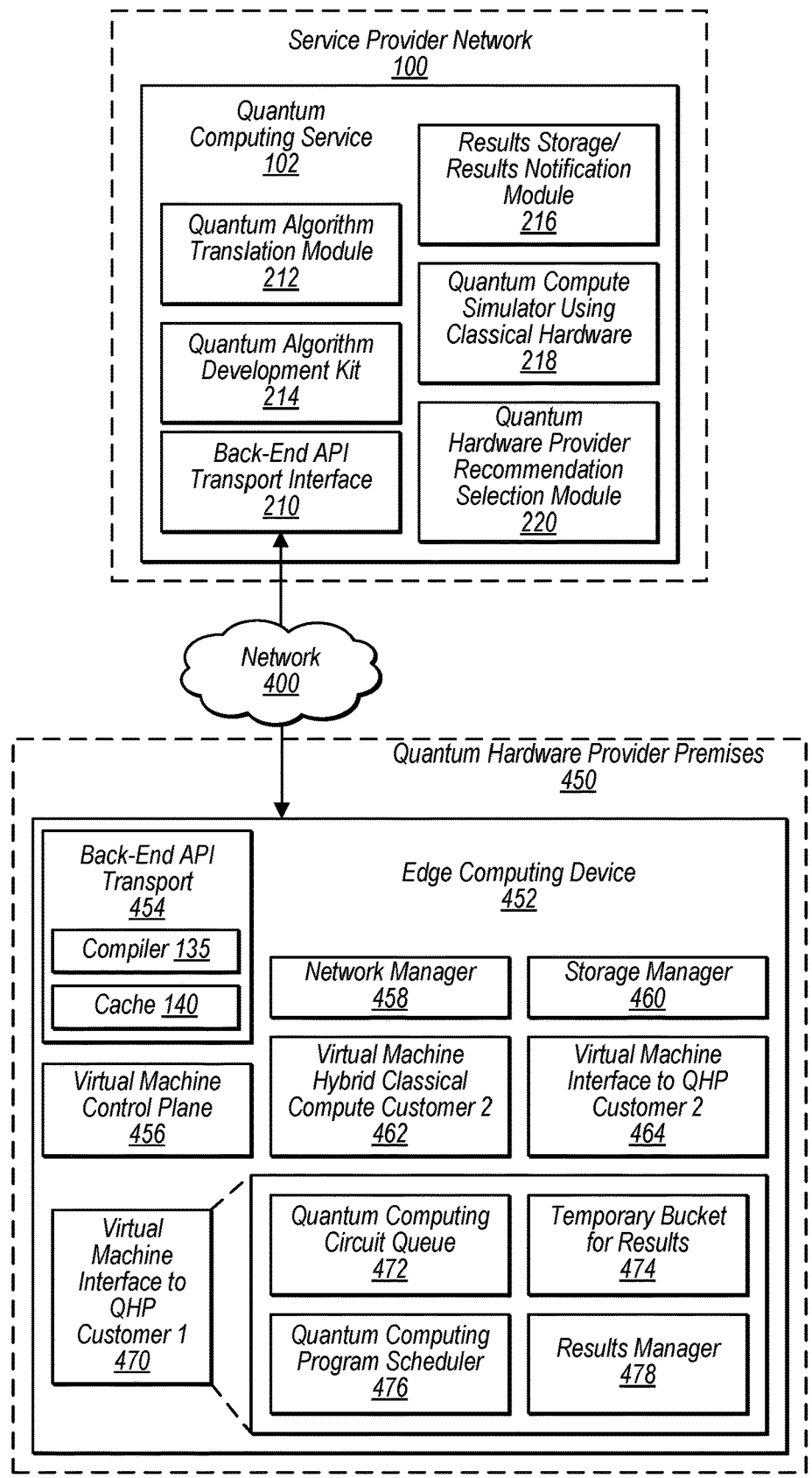
FIGS. 4A-4C illustrate an example edge computing device connected to a quantum computing service, according to some embodiments.
Figure 4B:
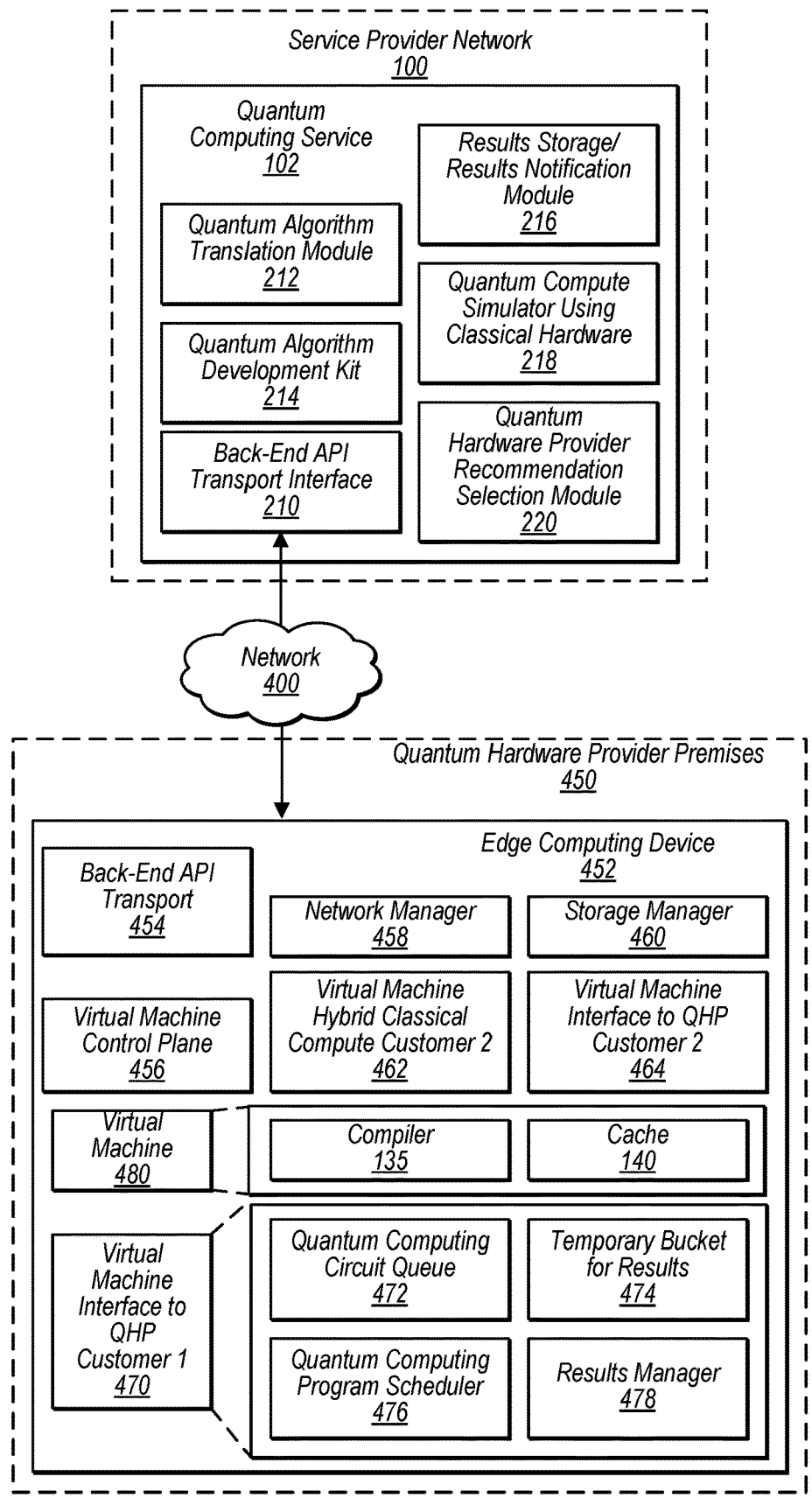
Figure 4C:
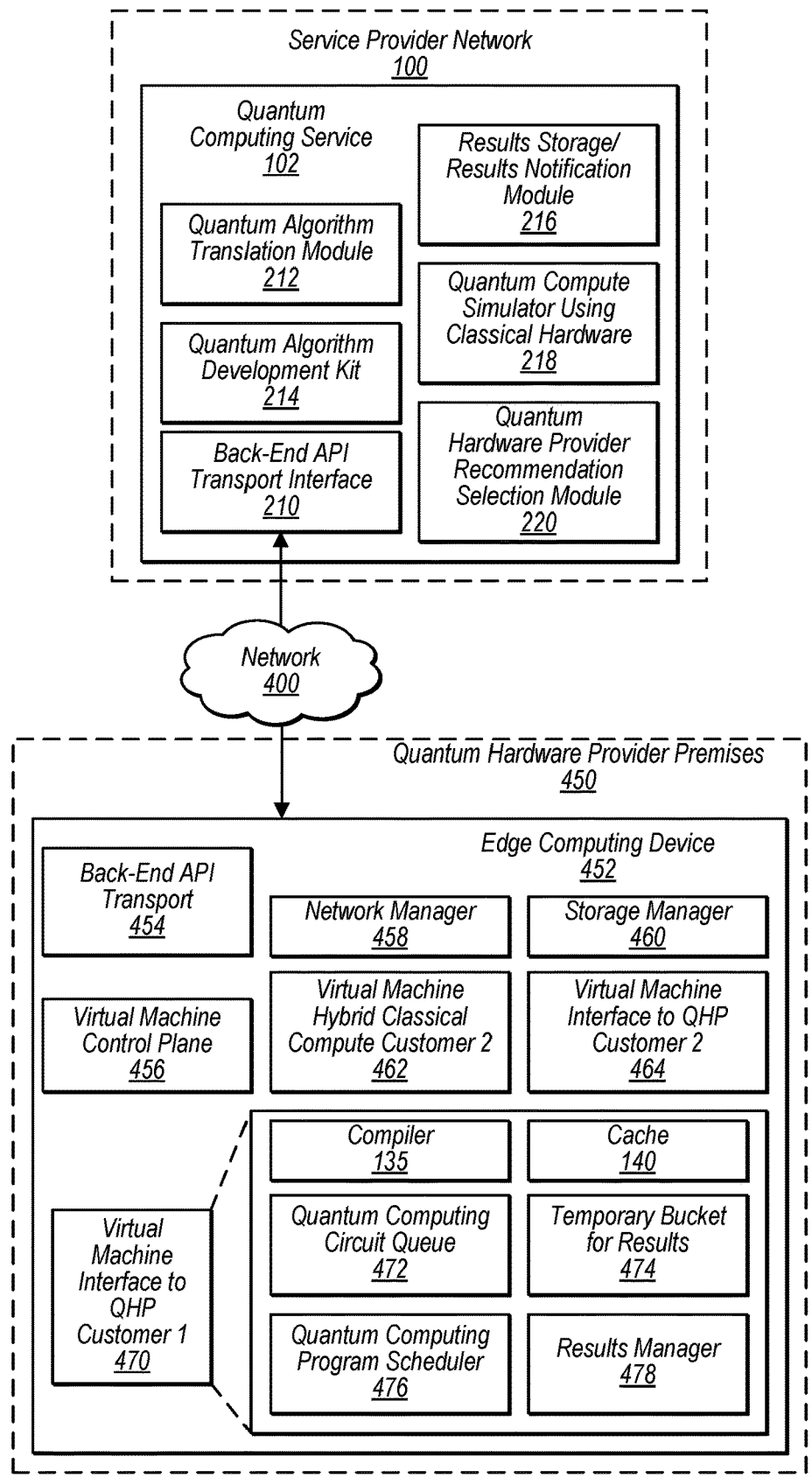

FIGS. 4A-4C illustrate an example edge computing device connected to a quantum computing service, according to some embodiments. In FIG. 4A, service provider network 100 and quantum computing service 102 may be similar to the service provider networks and quantum computing services described herein, such as in FIGS. 1-3. Also, edge computing device 452 may be a similar edge computing device as any of the edge computing devices described previously, such as in FIGS. 1-3. Edge computing device 452 is connected to service provider network 100 via network connection 400, which may be a logically isolated network connection via a public network, a dedicated physical non-public network link, or other suitable network connection.

Edge computing device 452 includes network manager 458, storage manager 460, and virtual machine control plane 456. In some embodiments, these components may be implemented on a virtualization offloading component, such as a virtualization offloading card. In some embodiments, a back-end application programmatic interface (API) transport of an edge computing device, such as back-end API transport 454 of edge computing device 452 may ping a quantum computing service to determine if there are quantum computing programs waiting to be transported to the edge computing device. The edge computing device may further use a non-public back-end API transport, such as back-end API transport 454 to bring the quantum computing program into the edge computing device 452.

In some embodiments, compiler 135 or at least a portion of compiler 135 for quantum computing programs may be implemented using computing resources on edge computing device 452, e.g., as part of back-end API transport 454. In some embodiments, compiler 135 on edge computing device 452 may be responsible for compile only quantum computing programs targeted for execution on the quantum computer of the quantum hardware provider at the location of edge computing device 452. In addition, in some embodiments, cache 140 or at least a portion of cache 140 for storing compiled files of quantum functions may also be implemented on edge computing device 452, e.g., using storage resources of edge computing device 452 as part of back-end API transport 454. In some embodiments, compiler 135 and/or cache 140 may still reside within edge computing device 452 but not necessarily within back-end API transport 454. For example, in some embodiments, compiler 135 and cache 140 may be implemented as part of a dedicated virtual machine 480 that is parallel to back-end API transport 454, as indicated in FIG. 4B. Alternatively, in some embodiments, compiler 135 and cache 140 may be implemented using resources of virtual machine 470 for a given customer of the quantum computing service, as indicated in FIG. 4C. In this case, the cached compiled files may be available and re-usable only by this specific customer of the quantum computing service. In some embodiments, compiled files stored in the cache on edge computing device 452 may be used by compiler 135 to compile a quantum computing program to reduce the compilation overhead. In some embodiments, some or all of the functionality of quantum algorithm translation module 212 may be performed by compiler 135, and thus quantum algorithm translation module 212 may be omitted from FIG. 4A.

Additionally, for each customer, a back-end API transport of an edge computing device of a quantum computing service, such as back-end API transport 454 of edge computing device 452, may cause a virtual machine to be instantiated to manage scheduling and results for a given quantum computing program pulled into the edge computing device from a back-end API. For example, virtual machine 470 may act as an interface to the quantum hardware provider for a given customer of the quantum computing service. The edge computing device may be directly connected to a local non-public network at the quantum hardware provider location and may interface with a scheduling component of the quantum hardware provider to schedule availability (e.g., time slots) on a quantum computer of the quantum hardware provider.

In some embodiments, the virtual machine 470 may be booted with a particular quantum machine image that supports interfacing with the scheduling component of the quantum hardware provider. In some embodiments, virtual machine 470 may be booted with a quantum circuit queuing component 472, a quantum circuit scheduling component 476, a component that manages a local storage bucket on the edge computing device to temporarily stores results, such as temporary bucket 474 and results manager 478.

In some embodiments, an edge computing device, such as edge computing device 452, may support multi-tenancy. Also, in some embodiments, edge computing device 452 may also instantiate virtual machines that execute classical computing tasks, such as a classical computing portion of a hybrid algorithm. For example, edge computing device 452 also includes a virtual machine 462 for another customer that performs classical compute portions of a hybrid algorithm and an additional virtual machine 464 for the other customer which acts as a quantum hardware provider interface for the other customer. In some embodiments, the multi-tenancy feature of edge computing device 452 may enable a compiled file of a quantum function stored in a cache on edge computing device 452 to be used across different customers.

In some embodiments, a back-end API transport of an edge computing device located a quantum hardware provider location may interface with a back-end API transport interface 110 of a computing device/router at a remote location where one or more computing devices that implement the quantum computing service are located.

Note that edge computing device 452 may be physically located at quantum hardware provider premises 450, such as in a building of a quantum hardware provider facility.

In some embodiments, the components of virtual machine 470 may be included in back-end API transport 454, and the back-end API transport 454 may execute the related components within the back-end API transport without causing a separate VM 470 to be instantiated.

Figure 4D:
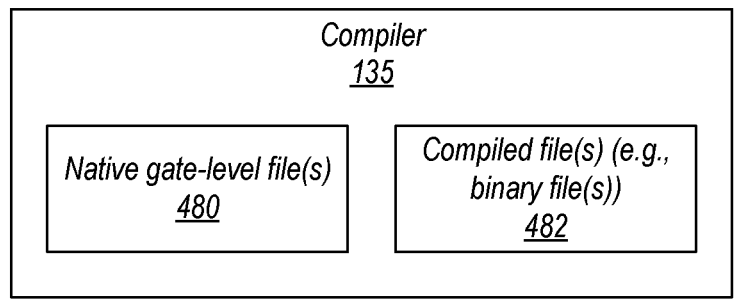
FIG. 4D shows example elements inside compiler and cache, according to some embodiments
Figure 4D:
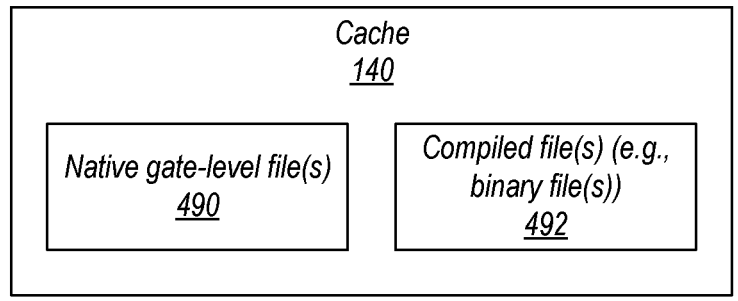

FIG. 4D shows example elements inside compiler and cache, according to some embodiments. As indicated in FIG. 4D, in some embodiments, compiler 135 may generate compiled file(s) 482 (e.g., binary file(s)) of one or more quantum computing functions. Further, in some embodiments, some or all of the functionality of quantum algorithm translation module 212 may be performed by compiler 135. For example, in some embodiments, compiler 135 may translate a quantum computing program from a generic representation (e.g., QCL, QASM, OpenQASM, #, Quil, Quipper, etc.) in to one or more native gate-level file(s) 480 (e.g., native Quil file(s)) specific to a quantum computer. In some embodiments, cache 140 may store one or more compiled file(s) 492 (e.g., including compiled file(s) 482 generated from compiler 135) and one or more native gate-level file(s) 490 (e.g., including native gate-level file(s) 480 generated from compiler 135).

Figure 5:
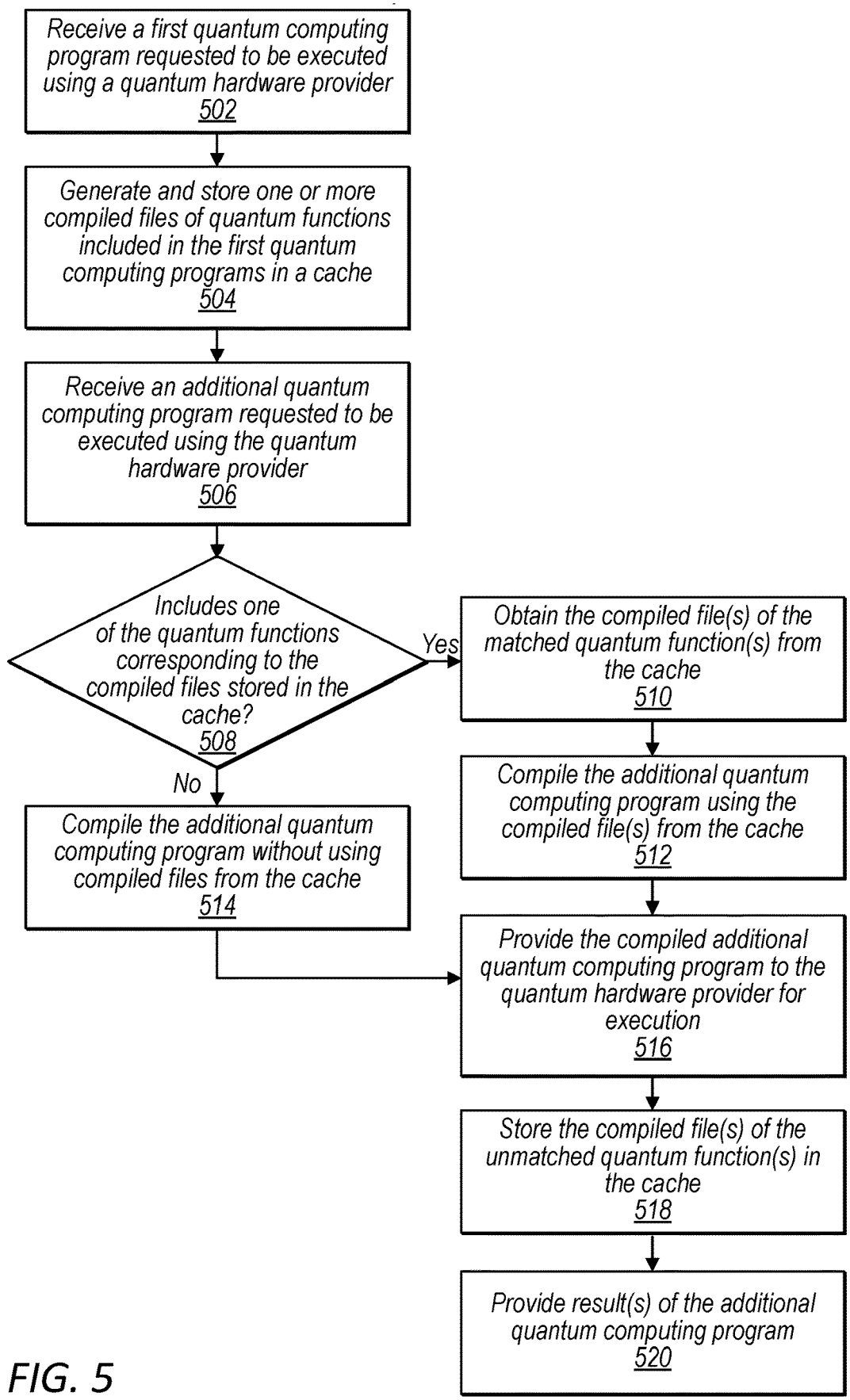
FIG. 5 illustrates an example process for compiling a quantum computing program using stored compiled files of quantum functions in a cache, according to some embodiments.

FIG. 5 illustrates an example process for compiling a quantum computing program using stored compiled files of quantum functions in a cache, according to some embodiments. In some embodiments, at 502, a quantum computing service (e.g., the quantum computing service 102 in FIGS. 1-3) may receive a first quantum computing program, requested for execution using a quantum hardware provider (e.g., at least one of the quantum hardware providers 122, 124, 126, and 128). As described above, in some embodiments, the first quantum computing program may be received from a customer via an interface. For instance, in some embodiments, the customer may use an interactive graphic interface provided by quantum program development kit 214 to develop and submit the quantum computing program. In addition, in some embodiments, the quantum computing program may be written in a generic, gate-level or non gate-level, source programming language (e.g., QCL, QASM, OpenQASM, Q #, Quil, Quipper, etc.) that may not be understood or executable directly by the quantum computer of the quantum hardware provider.

Thus, in some embodiments, at 504, the first quantum computing program may be compiled into a format executable on the quantum computer of the quantum hardware provider. As describe above, in some embodiments, the first quantum computing program may be first translated from the generic, gate-level or non gate-level, source programming language (e.g., QCL, QASM, OpenQASM, Q #, Quil, Quipper, etc.) to a native gate-level program file (e.g., native Quil file) specific for the quantum computer of the quantum hardware provider, and then the (translated) native gate-level program file may be compiled into the executable circuit file. During the compilation, a compiler may parse the first quantum computing program, identify one or more quantum functions included in the first quantum computing program, and link the compiled files of the quantum functions into the executable file of the first quantum computing program. In some embodiments, one or more of the compiled files of the quantum functions may be stored by the quantum computing service in a cache (e.g., cache 140 in FIG. 1). In some embodiments, the quantum computing service may store the compiled files of all the quantum functions that do not currently have corresponding compiled files in the cache. Alternatively, in some embodiments, the quantum computing service may selectively store the compiled files of only particular quantum functions. For example, in some embodiments, the quantum computing service may predict that some quantum functions are commonly used by the customers, e.g., based on monitoring of quantum computing programs historically received from the customers, and only store the compiled files of these commonly used quantum functions in the cache.

In some embodiments, the compiled files in the cache may be each associated with an identifier, which may be a hash value based on the name and parameters of the corresponding quantum function, the name the corresponding quantum function, or be created using other information of the corresponding quantum function. Further, in some embodiments, the identifier of a compiled file may indicate or be associated with an identifier of the quantum computer of the quantum hardware provider that is to be used for executing the first quantum computing program. Further, as described above, in some embodiments, the cache may be implemented as a centralized cache system (e.g., at a centralized location on computing devices of back-end API transport 210 in FIG. 2), or a decentralized cache system (e.g., on edge computing devices 234a, 234b, 234c, and 234d at respective quantum hardware providers 122, 124, 126, and 128 in FIG. 2). In some embodiments, the quantum computing service may transport the compiled first quantum computing program to the quantum hardware provider for execution.

In some embodiments, at 506, the quantum computing service may receive a second quantum computing program, requested for execution using the quantum hardware provider. In some embodiments, the second quantum computing program may be received from the same customer as the first quantum computing program, or alternatively from a different customer.

In some embodiments, at 508, the quantum computing service may determine whether the second quantum computing program includes one or more of the quantum functions corresponding to the compiled files in the cache. In some embodiments, this may be performed by examining whether the second quantum computing program references one or more identifiers indicating the quantum functions, e.g., based on the hash values or other types of identifiers stored in the cache.

In some embodiments, at 510, in response to a determination that the second quantum computing program includes at least one of the quantum functions identified in the cache, the quantum computing service may obtain the corresponding (previously) compiled file from the cache. Note that the second quantum computing program may still include one or more other quantum functions that do not have corresponding compiled files in the cache. For these unmatched quantum functions, the quantum computing service may cause one or more compiled files to be generated respectively for the unmatched quantum functions. In some embodiments, at 512, the quantum computing service may re-use the compiled file obtained from the cache (together with any newly generated compiled files for the unmatched quantum functions) to compile the second quantum computing program. Note that in some embodiments, the entire second quantum computing program may be compiled using pre-compiled file(s) from the cache. This may happen, for example, when the second quantum computing program is just one single quantum function (e.g., the matched quantum function at 508) or the remaining quantum functions (besides the matched quantum function at 508) of the second quantum computing program all have corresponding compiled files in the cache.

Alternatively, in some embodiments, at 514, in response to a determination that the second quantum computing program does not include a quantum function identified in the cache, the quantum computing service may cause the second quantum computing program to be compiled without using compiled files from the cache (as there is no matching compiled file in the cache). During the compilation, one or more new compiled files of the unmatched quantum functions in the second quantum computing program may be generated. In some embodiments, at 516, the quantum computing service may provide the compiled second quantum computing program, e.g., the executable code of the second quantum computing program, to the quantum hardware provider for execution.

In some embodiments, at 518, the quantum computing service may store the compiled files of the unmatched quantum functions, generated at 512 or 514, in the cache. In some embodiments, at 520, upon completion of the execution of the compiled second quantum computing program, one or more results may be returned from the quantum hardware provider to the quantum computing service, which may be further provided to the customer.

As described above, in some embodiments, the quantum computers of quantum hardware providers may need to be calibrated to reduce errors and decoherence in quantum computing. Thus, a compiled file created with benchmarking results from calibration at a point-in-time may not be valid any more when the benchmarking results expire. As a result, in some embodiments, the quantum computing service may recognize the validity periods of the compiled files in the cache, and render them invalid upon a determination of expiration of their validity periods. An invalid compiled file may not be re-used any more for compilation of future quantum computing programs.

Figure 6:
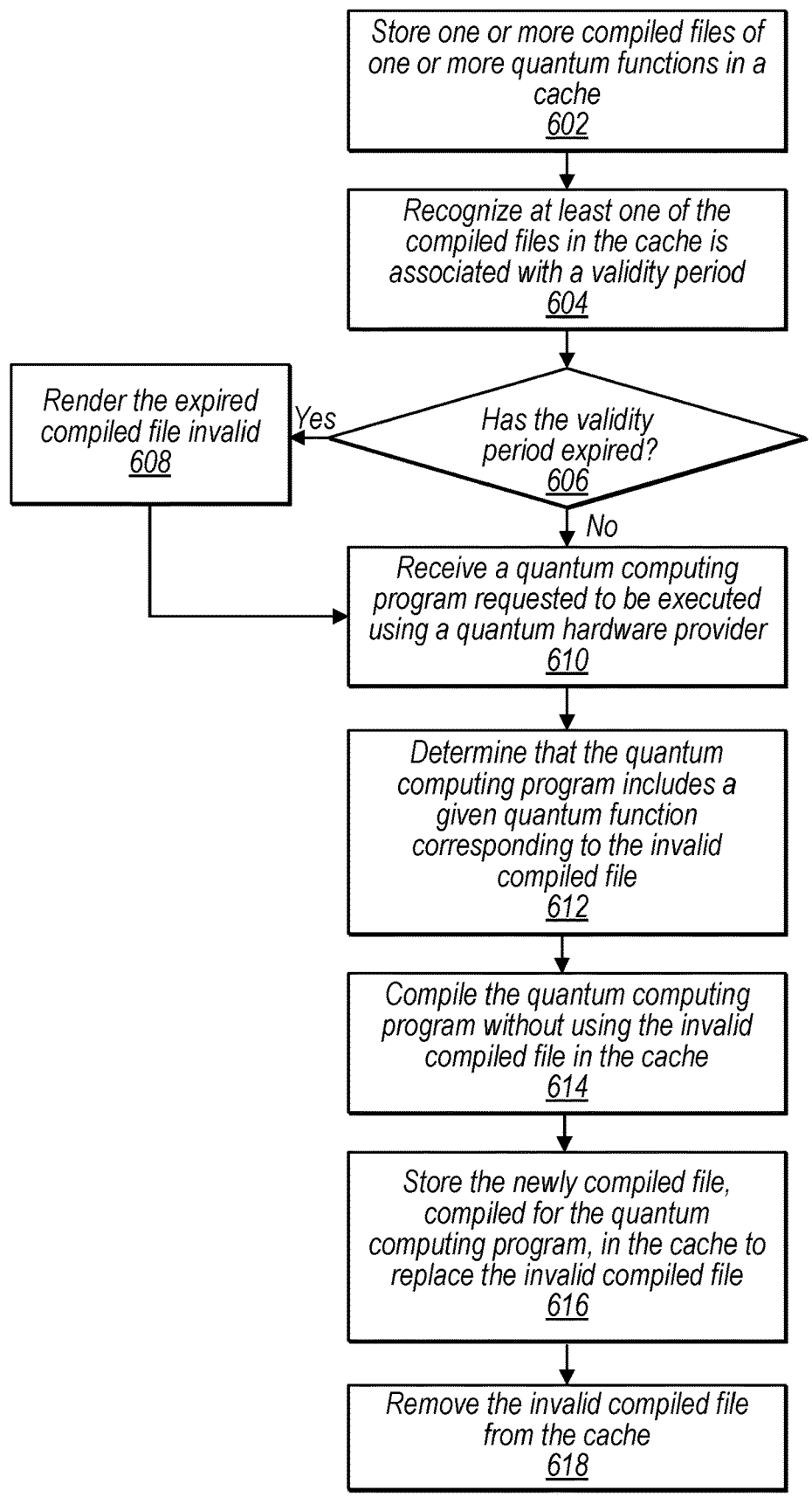
FIG. 6 illustrates an example process for updating a cache of compiled files, according to some embodiments.

FIG. 6 illustrates an example process for updating a cache of compiled files, according to some embodiments. In some embodiments, at 602, a quantum computing service (e.g., the quantum computing service 102 in FIGS. 1-3) may store one or more compiled files of respective quantum functions in a cache. In some embodiments, at 604, the quantum computing service may recognize that at least one of the compiled files in the cache may be associated with a validity period. In some embodiments, at 606, the quantum computing service may determine whether the validity period of the compiled file expires.

In some embodiments, at 608, when the quantum computing service determines that the validity period has expired, the quantum computing service may identify and render the expired compiled file invalid. In some embodiments, at 610, the quantum computing service may receive a quantum computing program requested for execution using a quantum hardware provider. In some embodiments, at 612, the quantum computing service may determine that the quantum computing program includes the quantum function corresponding to the invalid (or expired) compiled file in the cache.

In some embodiments, at 614, instead of using the invalid (or expired) compiled file in the cache, the quantum computing service may cause the quantum computing program to be compiled. During the compilation, a new compiled file of the quantum function corresponding to the invalid (or expired) compiled file may be generated. In some embodiments, the quantum computing service may transport the compiled quantum computing program to the quantum hardware provider for execution. In some embodiments, at 616, the quantum computing service may store the newly compiled file of the quantum function (together with any other compiled files of unmatched or expired quantum functions) in the cache to replace the invalid (or expired) compiled file. In some embodiments, at 618, the quantum computing service may remove the invalid (or expired) compiled file from the cache.

As described above, in some embodiments, the quantum hardware providers may be implemented using different quantum computing technologies. For example, some quantum computers may include qubits built from superconductors, trapped ions, semiconductors, photonics, etc. The format of the compiled file of a quantum function may need to be compatible with the quantum hardware, such that the compiled file may be "understood" and executable on the quantum computer of the corresponding quantum hardware provider. In other words, a compiled file for one type of quantum hardware may not be executable on another type of quantum hardware.

Figure 7:
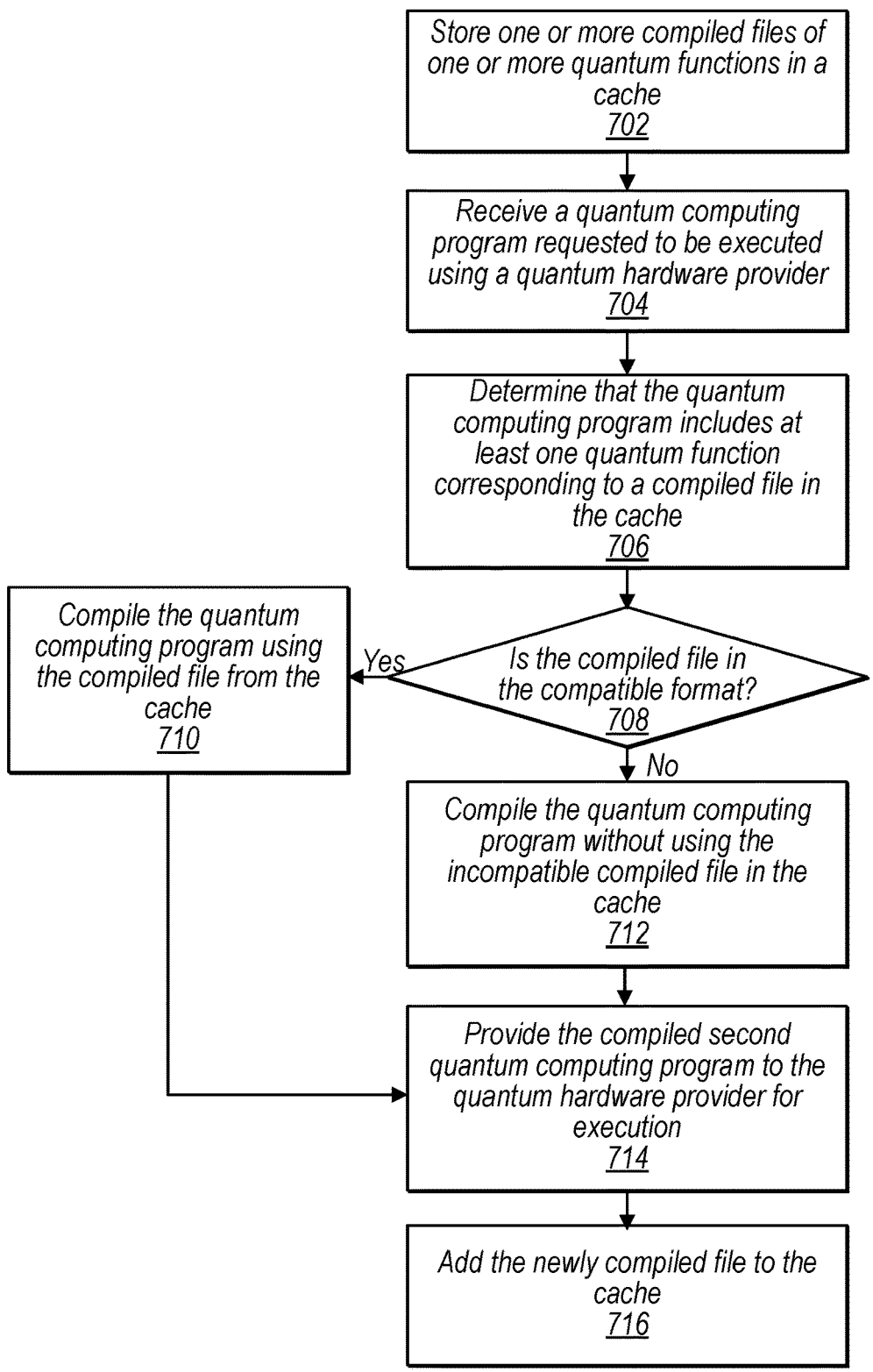
FIG. 7 illustrates an example process for using compiled files for quantum hardware providers of different quantum technologies, according to some embodiments.

FIG. 7 illustrates an example process for using compiled files for quantum hardware providers of different quantum technologies, according to some embodiments. In some embodiments, at 702, a quantum computing service (e.g., the quantum computing service 102 in FIGS. 1-3) may store one or more compiled files of respective quantum functions in a cache. In some embodiments, the compiled files may include a first compiled file of a first quantum function in a format in accordance with the quantum hardware of a first quantum hardware provider. In some embodiments, at 704, the quantum computing service may receive a quantum computing program requested for execution using a quantum hardware provider.

In some embodiments, at 706, the quantum computing service may determine that the quantum computing program includes the first quantum function corresponding to the first compiled file in the cache. In some embodiments, at 708, the quantum computing service may determine whether the first compiled file is in the compatible format. For example, when the quantum computing program is to be executed using the same (first) quantum hardware provider, the quantum computing service may determine that the first compiled file is in the compatible format, and at 710 may obtain the first compiled file from the cache and re-use the first compiled file to compile the quantum computing program. Alternatively, in some embodiments, when the quantum computing service detects that the quantum computing program is to be executed using a quantum hardware provider (e.g., a second quantum hardware provider) that uses different quantum technologies from the first quantum hardware provider, and at 712 may cause the quantum computing program to be compiled without using the incompatible first compiled file in the cache. During the compilation, a new compiled file of the first quantum function may be generated in the format executable on the quantum hardware of the second quantum hardware provider.

In some embodiments, at 714 the quantum computing service may provide the compiled second quantum computing program to the corresponding (e.g., the first or the second) quantum hardware provider for execution. In some embodiments, at 716 the quantum computing service may add the newly generated compiled file of the first quantum function to the cache.

In some embodiments, a customer may want to run a parametric experiment where a quantum computing program may be executed repeatedly by adjusting the value of a parameter (or argument) of a quantum function of the quantum computing program. In some embodiments, the customer may identify a parameter (or argument) in the quantum computing program whose value is to be adjusted during runtime, and provide an incremental change value and a value range according to which the value of the parameter (or argument) may be adjusted incrementally each step to sweep over the given value range. One purpose of the parametric experiment is to investigate effects of different values of the parameter (or argument) of the quantum function on the results of the quantum computing program, e.g., for optimization. The parametric experiment may require a parametric compilation, where an argument may be declared first as a parameter in the quantum computing program so that in compilation an indication (e.g., a pointer) of the memory address(es) that stores the value range of the parameter (or argument) may be embedded into the compiled quantum computing program. During runtime (or execution), the quantum computer may iteratively access the memory address at each step, retrieve an incremental value from the memory address, and execute the compiled quantum computing program using the retrieved incremental value of the parameter.

Figure 8:
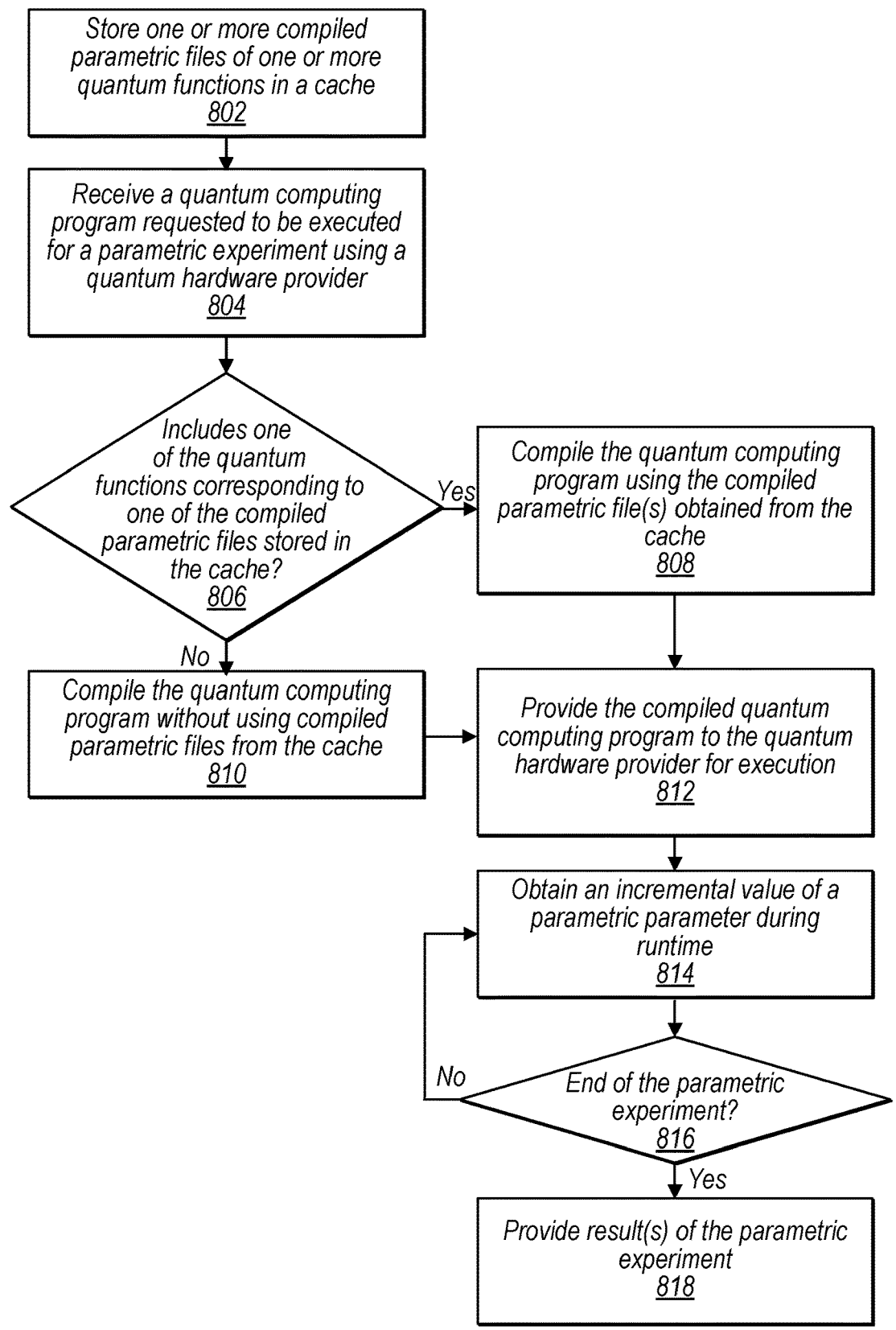
FIG. 8 illustrates an example process for using compiled files to implement a parametric compilation, according to some embodiments.

FIG. 8 illustrates an example process for using compiled files to implement a parametric compilation, according to some embodiments. In some embodiments, at 802, a quantum computing service (e.g., the quantum computing service 102 in FIGS. 1-3) may store one or more compiled parametric files of respective quantum functions in a cache. As described above, each of the compiled parametric file may be similar to a regular compiled file of a quantum function, except that it may include a declaration of an argument of the corresponding quantum function as a parameter. For example, a Rz function may need an argument, such as an angle θ, over which to perform a rotation around the Z-axis direction. Thus, the argument of the Rz function may be declared as a parameter representing an angle θ whose value may be adjusted between 0 and π/2. Thus, during compilation of the quantum computing program, a compiled parametric file of the Rz function may be generated (including the information indicative of the memory address of the parameter θ) and stored by the quantum computing service in the cache.

In some embodiments, at 804, the quantum computing service may receive a quantum computing program requested be executed for a parametric experiment using a quantum hardware provider. In some embodiments, at 806, the quantum computing service may determine whether the quantum computing program includes one or more of the quantum functions corresponding to the compiled parametric files in the cache. In some embodiments, at 806, the quantum computing service may determine that the quantum computing program includes at least one of the quantum functions that have a corresponding compiled parametric file in the cache. For example, in some embodiments, the quantum computing program may also include the Rz function. In response, at 808 the quantum computing service may obtain the compiled parametric file of the Rz function from the cache, and use it to compile the quantum computing program. Alternatively, in some embodiments, when the quantum computing program does not include a quantum function having a corresponding compiled parametric file in the cache, at 810 the quantum computing service may cause the quantum computing program to be compiled without using pre-compiled files from the cache (as there is no matching pre-compiled file in the cache).

In some embodiments, the quantum computing service may provide the compiled quantum computing program to the quantum provider for execution. Note that the compiled quantum computing program may include one or more parametric quantum function (e.g., the Rz function and/or some other parametric quantum functions). In some embodiments, at 814, the quantum computer of the quantum hardware provider may access the memory address of the parameter to obtain an incremental value of the parameter during runtime, and execute the compiled quantum computing program using the incremental value of the parameter (e.g., incrementally changing the value of $\theta$ from 0 to $\pi/2$). In some embodiments, at 816, the quantum computer of the quantum hardware provider may determine whether the parametric experiment has completed, e.g., whether the incremental value of the parameter has reached an end of the value range. If so, at 818, results of the parametric experiment of the quantum computing program may be provided to the customer. Otherwise, at 816, the quantum computer may retrieve the next incremental value of the parameter (at 814) and repeat the execution of the compiled quantum computing program.

Figure 9:
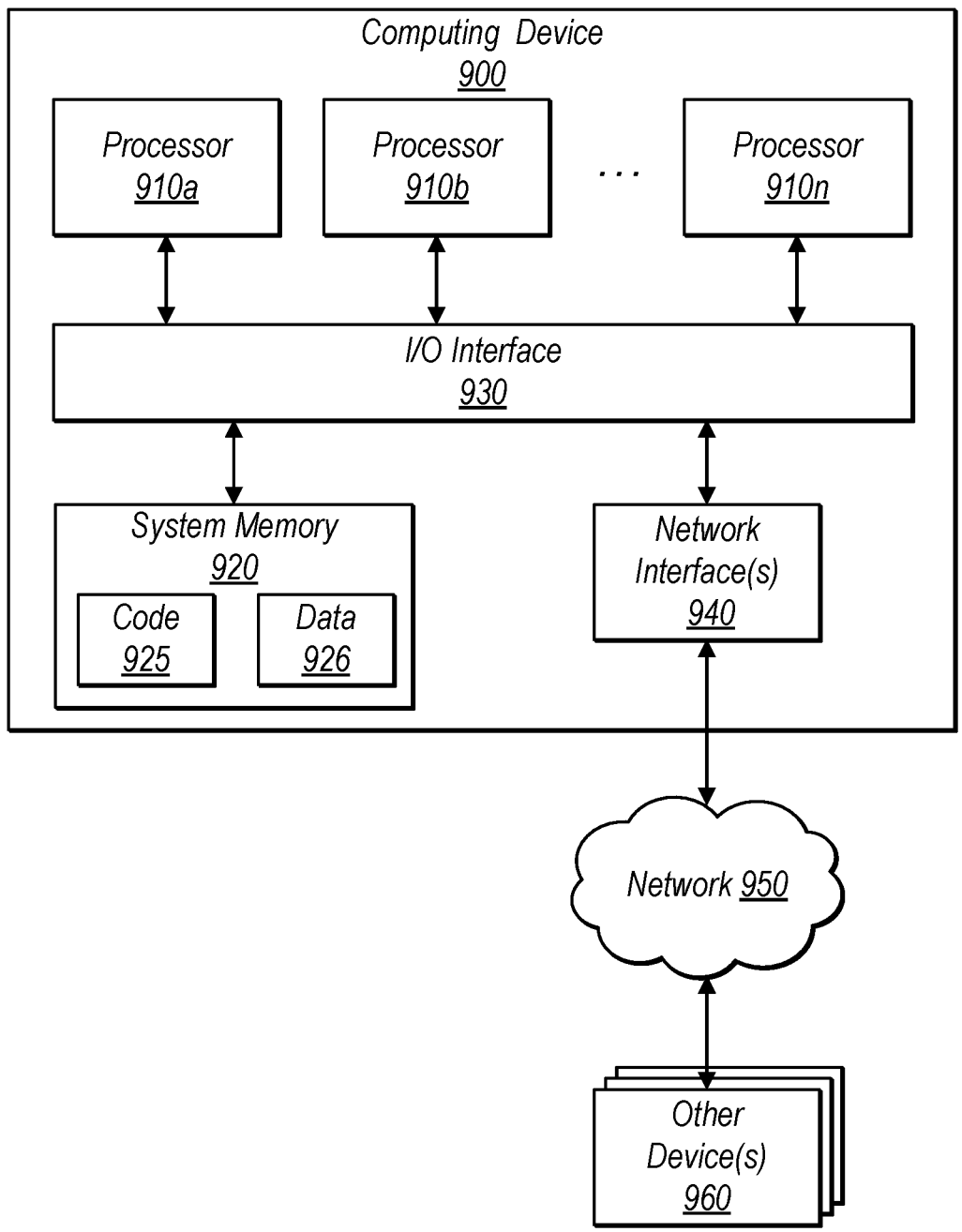
FIG. 9 is a block diagram illustrating an example computing device that may be used in at least some embodiments.

FIG. 9 is a block diagram illustrating an example computing device that may be used in at least some embodiments. In the illustrated embodiment, computing device 900 includes one or more processors 910 coupled to a system memory 920 (which may comprise both non-volatile and volatile memory modules) via an input/output (I/O) interface 930. Computing device 900 further includes a network interface 940 coupled to I/O interface 930.

In various embodiments, computing device 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. In some implementations, graphics processing units (GPUs) may be used instead of, or in addition to, conventional processors.

System memory 920 may be configured to store instructions and data accessible by processor(s) 910. In at least some embodiments, the system memory 920 may comprise both volatile and non-volatile portions; in other embodiments, only volatile memory may be used. In various embodiments, the volatile portion of system memory 920 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 920 as code 925 and data 926.

In some embodiments, I/O interface 930 may be configured to coordinate I/O traffic between processor 910, system memory 920, and any peripheral devices in the device, including network interface 940 or other peripheral interfaces such as various types of persistent and/or volatile storage devices. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other devices 960 attached to a network or networks 950, such as other computer systems or devices as illustrated in FIG. 1 through FIG. 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 900 as system memory 920 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 940. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to implement a quantum computing service to allow access to one or more quantum hardware providers, wherein the quantum computing service is configured to:
receive a first quantum computing program requested to be executed using at least one of the quantum hardware providers;
generate one or more compiled files corresponding to one or more quantum functions included in the first quantum program in a format executable on a quantum computer of the at least one quantum hardware provider;
store in a cache at least one of the one or more compiled files;
receive a second quantum computing program requested to be executed using the at least one quantum hardware provider;
determine whether the second quantum computing program includes at least one of the quantum functions corresponding to the compiled files stored in the cache; and in response to a determination that the second quantum computing program includes a first quantum function that has a corresponding compiled file in the cache,
obtain from the cache the compiled file of the first quantum function;
compile the second quantum computing program using the compiled file of the first quantum function obtained from the cache; and
provide the compiled second quantum computing program for execution on the quantum computer of the at least one quantum hardware provider.

2. The system of claim 1, wherein to determine whether the second quantum computing program includes at least one of the quantum functions, the quantum computing service is configured to determine whether the second quantum computing program references an identifier indicating at least one of the quantum functions in the cache.

3. The system of claim 1, wherein the first quantum computing program is received from a first client, and wherein the second quantum computing program is received from the first client or another client.

4. The system of claim 1, the quantum computing service is further configured to:
determine that the second quantum computing program includes a second quantum function that does not have a compiled file stored in the cache;
generate a compiled file of the second quantum function in the format executable on the quantum computer of the at least one quantum hardware provider;
compile the second quantum computing program using the compiled file of the first quantum function obtained from the cache and the generated compiled file of the second quantum function; and
store the compiled file of the second quantum function in the cache.

5. The system of claim 1, wherein at least one of the compiled files in the cache is associated with a validity period in connection with calibration of the quantum computer of the at least one quantum hardware provider, and wherein the quantum computing service is configured to render the at least one compiled file invalid upon a determination of expiration of the validity period.

6. A method, comprising:
receiving, at a quantum computing service implemented using one or more computing devices, a quantum computing program requested to be executed using a quantum hardware provider;
determining, by the quantum computing service, whether the quantum computing program includes a first quantum function with a corresponding compiled file in a cache in a format executable on a quantum computer of the quantum hardware provider; and
responsive to determining that the quantum computing program includes the first quantum function that has a corresponding compiled file in the cache,
compiling, by the quantum computing service, the quantum computing program using the compiled file obtained from the cache corresponding to the first quantum function; and
providing the compiled quantum computing program to the quantum hardware provider for execution.

7. The method of claim 6, wherein determining whether the quantum computing program includes the first quantum function comprises determining whether the quantum computing program references an identifier indicating the first quantum function in the cache.

8. The method of claim 6, wherein the quantum computing program is received from a first client, and wherein the compiled file of the first quantum function in the cache is associated with an indication specifying that the compiled file of the first quantum function is allowed to be used to compile quantum computing programs received from another client.

9. The method of claim 6, further comprising:
determining that the quantum computing program includes a second quantum function that does not have a compiled file stored in the cache;
causing a compiled file of the second quantum function to be generated in the format executable on the quantum computer of the quantum hardware provider;
compiling the quantum computing program using the compiled file of the first quantum function obtained from the cache and the generated compiled file of the second quantum function; and
storing the compiled file of the second quantum function in the cache.

10. The method of claim 6, further comprising:
determining that remaining one or more quantum functions in the quantum computing program individually have corresponding compiled files stored in the cache;
obtaining from the cache the compiled file of the remaining quantum functions; and
compiling the quantum computing program using the compiled files of the first quantum function and the remaining quantum functions obtained from the cache.

11. The method of claim 6, further comprising:
recognizing that at least one of compiled files in the cache is associated with a validity period in connection with calibration of the quantum computer of the at least one quantum hardware provider; and
rendering the at least one compiled file invalid upon a determination of expiration of the validity period.

12. The method of claim 6, wherein at least a portion of the cache storing the compiled file of the first quantum function resides in a first edge computing device located at a location of the quantum hardware provider.

13. The method of claim 6, further comprising:
generating a translated file of the first quantum function, based on a translation of the quantum computing program from a generic representation to a native representation specific to the quantum hardware provider; and
storing the translated file of the first quantum function in the native representation in the cache.

14. One or more non-transitory computer readable media storing program instructions that, when executed on or across one or more processors, cause the one or more processors to:
receive, via an interface, a quantum computing program requested to be executed using a quantum computer of at least one of one or more quantum hardware providers;
determine whether the quantum computing program includes at least one of one or more quantum functions that have corresponding compiled files in a cache in a format executable on the quantum computer of the at least one quantum hardware provider;
responsive to determining that the quantum computing program includes a first quantum function that has a corresponding compiled file in the cache,
compile the quantum computing program using the compiled file obtained from the cache corresponding to the first quantum function; and
provide the compiled quantum computing program to the at least one quantum hardware provider for execution.

15. The non-transitory computer readable media of claim 14, wherein to determine whether the quantum computing program includes at least one of the quantum functions, the program instructions cause the one or more processors to determine whether the quantum computing program references an identifier indicating at least one of the quantum functions in the cache.

16. The non-transitory computer readable media of claim 14, wherein the quantum computing program is received from a first client, and wherein the compiled files in the cache is associated with an indication specifying that the compiled file of the first quantum function is allowed to be used to compile quantum computing programs received from another client.

17. The non-transitory computer readable media of claim 14, wherein the program instructions further cause the one or more processors to:
determine that the quantum computing program includes a second quantum function that does not have a compiled file stored in the cache;
generate a compiled file of the second quantum function in the format executable on the quantum computer of the at least one quantum hardware provider;
compile the quantum computing program using the compiled file of the first quantum function obtained from the cache and the generated compiled file of the second quantum function; and
store the compiled file of the second quantum function in the cache.

18. The non-transitory computer readable media of claim 14, wherein the program instructions further cause the one or more processors to:
determine that remaining one or more quantum functions in the quantum computing program individually have corresponding compiled files stored in the cache;
obtain from the cache the compiled file of the remaining quantum functions; and
compile the quantum computing program using the compiled files of the first quantum function and the remaining quantum functions obtained from the cache.

19. The non-transitory computer readable media of claim 14, wherein the program instructions further cause the one or more processors to:
recognize that at least one of the compiled files in the cache is associated with a validity period in connection with calibration of the quantum computer of the at least one quantum hardware provider; and
render the at least one compiled file invalid upon a determination of expiration of the validity period.

20. The non-transitory computer readable media of claim 14, wherein at least a portion of the cache storing the compiled file of the first quantum function resides in a first edge computing device located at a location of the quantum computer of the at least one quantum hardware provider.

* * * * *